(12) United States Patent
Morita et al.

(10) Patent No.: US 7,868,904 B2
(45) Date of Patent: Jan. 11, 2011

(54) IMAGE PROCESSING METHOD AND IMAGE PROCESSING APPARATUS

(75) Inventors: Kenji Morita, Yokohama (JP);
Masahiro Suzuki, Kawasaki (JP);
Akihiro Katayama, Yokohama (JP);
Kaname Tanimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1322 days.

(21) Appl. No.: 11/392,600

(22) Filed: Mar. 30, 2006

(65) Prior Publication Data
US 2006/0244820 A1    Nov. 2, 2006

(30) Foreign Application Priority Data

Apr. 1, 2005    (JP)    ............................. 2005-106784
Apr. 1, 2005    (JP)    ............................. 2005-106794

(51) Int. Cl.
*G09G 5/00* (2006.01)

(52) U.S. Cl. ....................................... 345/633; 345/629

(58) Field of Classification Search ................ 345/633, 345/629, 632
See application file for complete search history.

(56) References Cited

U.S. PATENT DOCUMENTS

| | | | | |
|---|---|---|---|---|
| 5,696,892 | A * | 12/1997 | Redmann et al. | 345/582 |
| 6,445,815 | B1 | 9/2002 | Sato | 382/154 |
| 6,549,641 | B2 * | 4/2003 | Ishikawa et al. | 382/103 |
| 6,657,637 | B1 * | 12/2003 | Inagaki et al. | 345/629 |
| 6,789,039 | B1 * | 9/2004 | Krumm | 702/150 |
| 6,970,166 | B2 | 11/2005 | Kuroki et al. | 345/428 |
| 7,116,342 | B2 * | 10/2006 | Dengler et al. | 345/630 |
| 7,173,672 | B2 * | 2/2007 | Gibbs et al. | 348/589 |
| 7,391,424 | B2 * | 6/2008 | Lonsing | 345/633 |
| 7,453,471 | B2 * | 11/2008 | Fukui et al. | 345/633 |
| 7,634,130 | B2 * | 12/2009 | Yoda et al. | 382/154 |
| 2002/0036649 | A1 * | 3/2002 | Kim et al. | 345/633 |
| 2004/0109009 | A1 * | 6/2004 | Yonezawa et al. | 345/632 |
| 2005/0212801 | A1 | 9/2005 | Kuroki et al. | 345/428 |
| 2006/0044327 | A1 | 3/2006 | Okuno et al. | 345/626 |
| 2006/0221098 | A1 * | 10/2006 | Matsui et al. | 345/633 |
| 2007/0035562 | A1 * | 2/2007 | Azuma et al. | 345/633 |
| 2007/0146390 | A1 * | 6/2007 | Noro et al. | 345/633 |
| 2007/0242899 | A1 * | 10/2007 | Satoh et al. | 382/286 |

FOREIGN PATENT DOCUMENTS

| | | |
|---|---|---|
| JP | 11-331874 | 11/1999 |
| JP | 2001-078179 | 3/2001 |
| JP | 2004-282784 | 10/2004 |

* cited by examiner

*Primary Examiner*—M Good Johnson
(74) *Attorney, Agent, or Firm*—Fitzpatrick, Cella, Harper & Scinto

(57) ABSTRACT

On a captured image corresponding to acquisition time t of acquisition of the captured image, a virtual-space image based on the position and/or orientation at time that depends on the time t and a lag d is superimposed. An image on which the virtual-space image is superimposed is displayed. (S602-S606).

17 Claims, 15 Drawing Sheets

DATA ACQUISITION TIME →

IMAGE PROCESSING METHOD AND IMAGE PROCESSING APPARATUS

FIELD OF THE INVENTION

The present invention relates to a technology for superimposing an image in a virtual space on a physical space and presenting the resulting image.

BACKGROUND OF THE INVENTION

An augmented-reality system involves measuring the position of an operator's viewpoint, the direction of the operator's line of sight, and the position of an object in a space. One typical method used in systems for measuring the position and orientation uses a position and orientation measuring device such as FASTRAK (registered trademark) from Polhemus. Another known method uses such a device as a gyroscope to measure only the orientation and measures positional information and orientation drift errors from images.

However, it is usually difficult to match the time at which an image in a physical space was acquired in a conventional augmented-reality system and the time at which the position and orientation measured by the position and orientation measuring device were acquired.

Especially in a method in which an image in a physical space is first captured into a computer and then an image in a virtual space is superimposed on it, there is a time lag between the capture of the physical-space image and the superimposition of the virtual-space image. Therefore, a virtual-space image acquired later than the time of acquisition of a physical-space image is used and accordingly the physical-space image will be misaligned with the virtual-space image. This result in a degradation of the quality of the observer's visual experience of a combination of these images.

In such a case, slightly older measurements may be used to generate a virtual-space image, in order to eliminate misalignment between the physical-space and virtual-space images. However, it has been difficult to determine which past measurements should be used.

SUMMARY OF THE INVENTION

The present invention has been made in light of the problem described above and an object of the present invention is to provide a technology for readily obtaining a time lag between the acquisition of a physical-space image and the acquisition of position and orientation in order to generate a virtual-space image based on the position and orientation acquired at approximately the same time at which the physical-space image is acquired.

In order to achieve an object of the present invention, for example, an image processing method of the present invention comprises the following arrangement.

That is, an image processing method comprising:

a first storage step of storing a captured image of each frame of moving images acquired from an imaging device which captures moving images in a physical space, in association with the time at which the image has been captured;

a second storage step of storing the position and/or orientation of the imaging device acquired from a sensor measuring the position and/or orientation of the imaging device, in association with the time of acquisition of the position and/or orientation;

a lag setting step of setting data d representing a lag;

a generation step of generating an image by superimposing a virtual-space image based on a position and/or orientation that depend on time t or a lag d on the captured image whose acquisition time corresponds to time t;

a display step of displaying the image generated at the generation step; and a determination step of determining a lag d on the basis of a user instruction.

In order to achieve an object of the present invention, for example, an image processing apparatus of the present invention comprises the following arrangement.

That is, an image processing apparatus comprising:

first storage unit adapted to store a captured image of each frame of moving images acquired from an imaging device which captures moving image in a physical space, in association with the time at which the image has been captured;

second storage unit adapted to store the position and/or orientation of the imaging device acquired from a sensor measuring the position and/or orientation of the imaging device, in association with the time of acquisition of the position and/or orientation;

lag setting unit adapted to set data d representing a lag;

generation unit adapted to generate an image by superimposing a virtual-space image based on a position and/or orientation that depends on time t and a lag d on the captured image whose acquisition time corresponds to time the t;

display unit adapted to display the image generated by the generation unit; and determination unit adapted to determine a lag d on the basis of a user instruction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
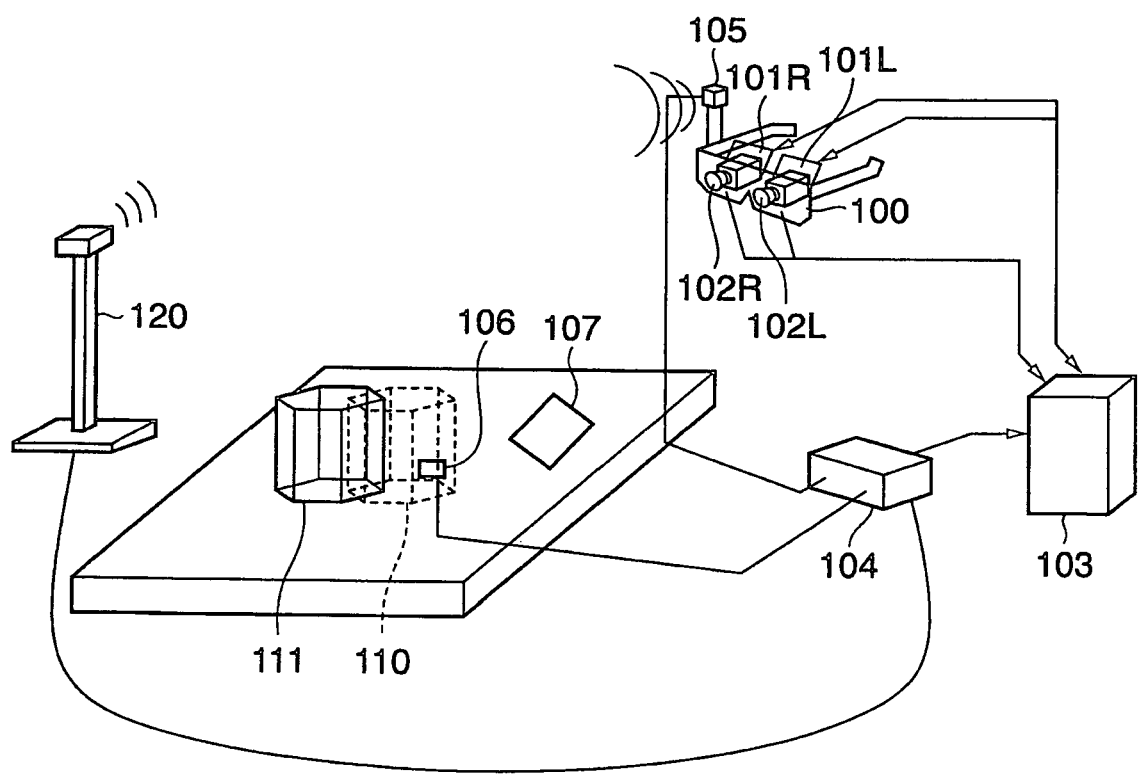
FIG. 1 shows an external view of a system which performs a process for presenting an augmented reality space in which a virtual space is superimposed on a physical space to an observer (user) according to a first embodiment of the present invention.

FIG. 1 shows an external view of a system which performs a process for providing an augmented-reality space generated by superimposing a virtual space on a physical space to an observer (user) according to an embodiment.

In FIG. 1, reference numeral 120 denotes a transmitter which generates a magnetic field. In this embodiment, a position and orientation measuring device such as FASTRAK (registered trademark) from Polhemus is used as the system for measuring positions and orientations. However, the essence of the following description is not limited to this. It will be appreciated from the following description that other techniques may be used in which such a device as a gyroscope is used to measure only the orientation and measure positional information and orientation drift errors from images.

Reference numeral 100 denotes a Head Mounted Display (hereinafter abbreviated as HMD) worn on the head of an observer for presenting a combination image of a physical space and a virtual space to the observer's line of sight. The HMD 100 includes cameras 102R and 102L, display devices 101R and 101L, and a magnetic receiver 105.

The cameras 102R and 102 are used for continuously taking images of physical spaces that are viewed by the right and left eyes, respectively, of an observer wearing HMD 100 on the head. The each frame image taken is outputted to a computer 103 provided in the subsequent stage. In the following description, the camera 102R for the right eye and the camera 102L for the left eye will be sometimes collectively called the "camera 102" unless distinction between them is to be made.

The display devices 101R and 101L are attached to the HMD 100 in such a manner that the display devices 101R and 101L are positioned in front of the right and left eyes, respectively, when the observer is wearing the HMD 100 on the head. Accordingly, images generated by the computer 103 are presented in front of the observer's right and left eyes. In the following description, the display device 101R for the right eye and the display device 101L for the left eye will be sometimes collectively called the "display device 101" unless distinction between them is to be made.

The magnetic receiver 105 detects a change of a magnetic field produced by the transmitter 120 and outputs the result of the detection as a signal to a position and orientation measuring device 104 provided in the subsequent stage. The signal of the result of the detection represents a change of the magnetic field that is detected according to the position and orientation of the magnetic receiver 105 in a coordinate system (hereinafter referred to as the sensor coordinate system) with the x, y, and z axes orthogonal to one another at the coordinate system's origin point that is at the position of the transmitter 120.

The position and orientation measuring device 104 determines from the signal the position and orientation of the magnetic receiver 105 in the sensor coordinate system and provides data indicating the determined position and orientation to the computer 103 provided in the subsequent stage.

Reference numeral 107 denotes a marker provided for the purpose of correcting measurements obtained by the magnetic receiver 105. If correction is not to be performed, the marker is not necessary.

Reference numeral 111 denotes a virtual object provided so as to be superimposed on a physical object 110. With this, the colors and patterns of the physical object 110 can be modified and the modified physical object 110 can be presented to the observer. This function can be used to apply virtual-space images of various designs on an image of a mockup that represents only the shape of a product, in order to see what they would look like.

Attached to the physical object 110 is a magnetic receiver 106 similar to the magnetic receiver 105, that detects a change of a magnetic field produced by the transmitter 120 and outputs a signal representing the result of the detection to the position and orientation measuring device 104 provided in the subsequent stage. The signal of the result of the detection represents a change of the magnetic field detected in the sensor coordinate system according to the position and orientation of the magnetic receiver 106.

The position and orientation measuring device 104 determines from the signal the position and orientation of the magnetic receiver 106 in the sensor coordinate system and provides data indicating the determined position and orientation to the computer 103 provided in the subsequent stage.

Figure 10:
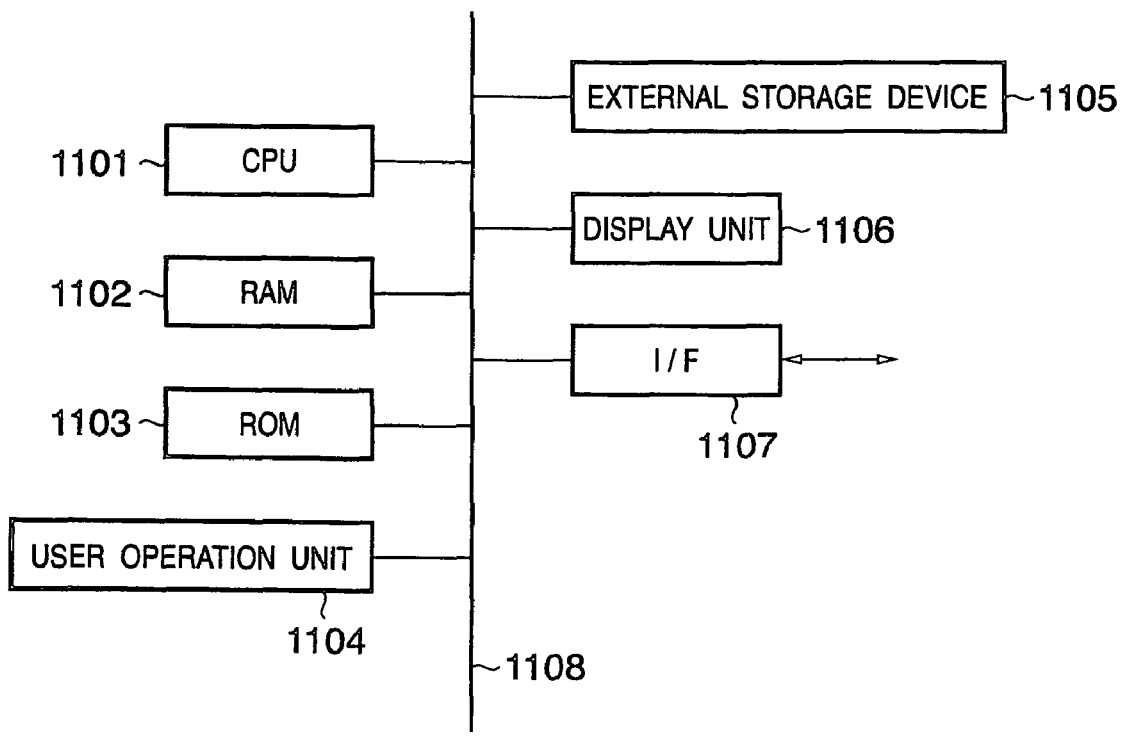
FIG. 10 shows a hardware configuration of the computer 103.

The computer 103 performs processing such as generation of image signals to be provided to the display devises 101R and 101L of the HMD 100 and management of data received from the position and orientation measuring device 104. Typically, the computer 103 is a personal computer (PC) or a workstation (WS). FIG. 10 shows a hardware configuration of the computer 103.

Reference numeral 1101 denotes a CPU, which controls the entire computer 103 using programs and data stored in a RAM 1102 or ROM 1103 and also controls data communications with external devices connected to an interface (I/F) 1107. The CPU 1101 also performs various kinds of processing performed in the computer 103, which will be described later. A timer, not shown, is provided in the CPU 1101 that is capable of measuring the current time.

Reference numeral 1102 denotes a RAM capable of providing various areas as required, such as an area for temporarily storing a program or data loaded from an external storage device 1105, an area for temporarily storing various kinds of data received through the interface 1107, and a work area required for the CPU 1101 to perform various kinds of processing.

Reference numeral 1103 denotes a ROM which stores a boot program and configuration data for the computer 103.

Reference numeral 1104 denotes a user operation unit which is implemented by a keyboard, mouse, and/or joystick and various instructions can be inputted into the CPU 1101.

Reference numeral 1105 denotes an external storage device functioning as a mass information storage device such as a hard disk drive device. The external storage device 1105 stores programs and data for causing an operating system (OS) and the CPU 1101 to perform various processes, which will be described later. Part or all of the programs or data are loaded into the RAM 1102 under the control of the CPU 1101. Also stored in the external storage device 1105 is what will be described as known data (information) in the later description (or data required for the processes described later), which is loaded into the RAM 1102 as required under the control of the CPU 1101.

Reference numeral 1106 denotes a display unit which is implemented by a CRT or a liquid crystal display and is capable of displaying results of processing performed by the CPU 1101 as graphics or text.

Reference numeral 1107 denotes the interface to which the position and orientation measuring device 104 and the HMD 100 are connected. The computer 103 can perform data communication with the position and orientation measuring device 104 and the HMD 100 through the interface 1107.

Reference numeral 1108 denotes a bus interconnecting the components described above.

The computer 103 with the configuration described above captures physical-space images taken with the cameras 102R and 102L and generates images of a virtual object 111 viewed from the cameras 102R and 102L on the basis of positions and orientations obtained from the magnetic receivers 105 and 106. The computer 103 then superimposes the generated images on the previously obtained physical-space images and outputs the resulting images to the display devices 101R and 101L. As a result, augmented-reality-space images corresponding to the positions and orientation of the right and left eyes of the observer wearing the HMD 100 on the head are displayed in front of the right and left eyes.

Figure 2:
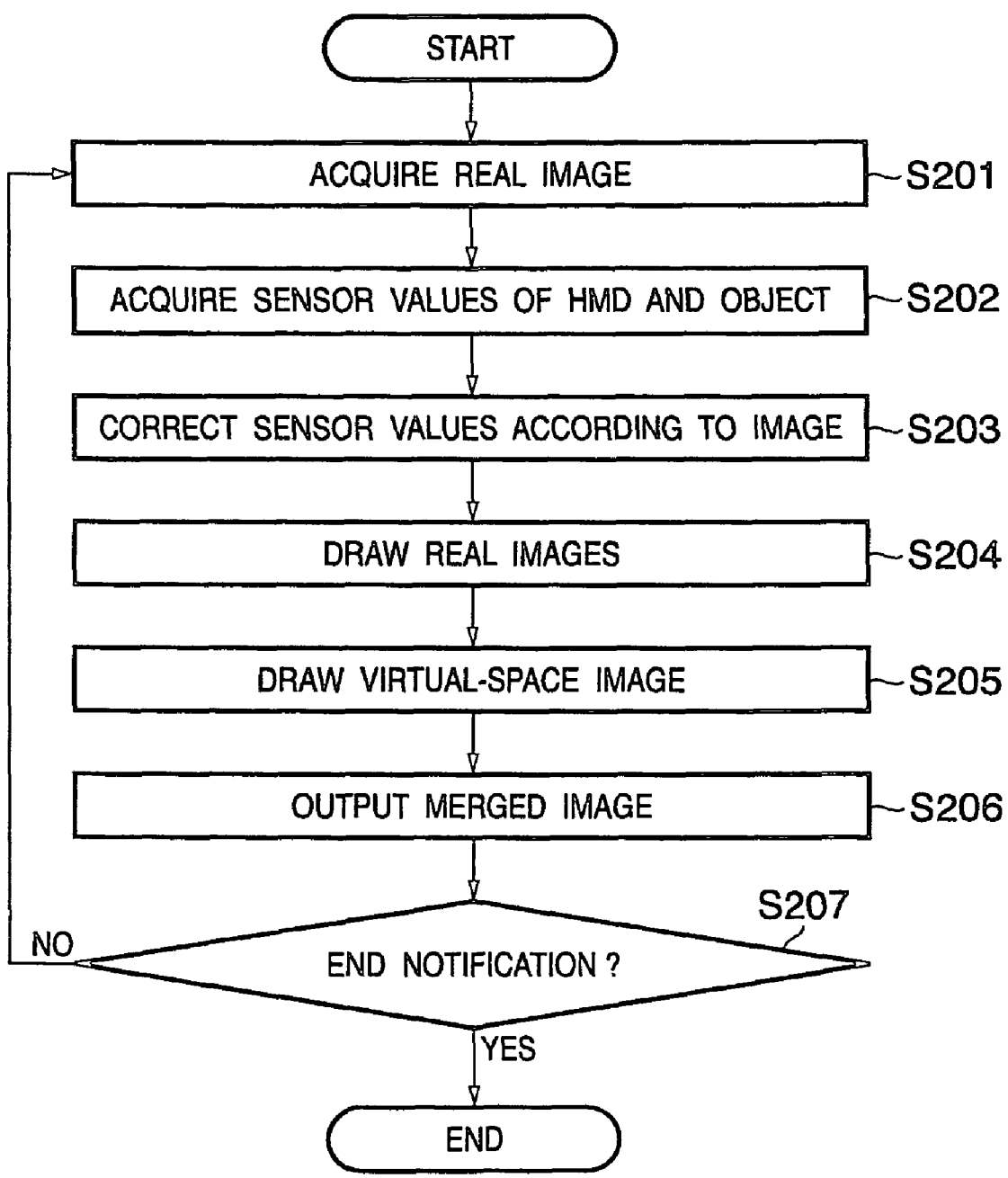
FIG. 2 is a flowchart of a series of processes for generating an augmented-reality-space image and outputting the image on an HMD 100.

FIG. 2 is a flowchart of a series of processes for generating such augmented-reality-space images and outputting them to the HMD 100. It should be noted that a program and data for causing the CPU 1101 to perform the process according to the flowchart shown in FIG. 2 are stored in an external storage device 1105, which are then loaded into the RAM 1102 for processing by the CPU 1101, thereby causing the computer 103 to perform the operations described below.

First, physical-space images (real images) taken with the cameras 102R and 102L are inputted into the computer 103 through the interface 1107, which are then stored sequentially in the RAM 1102 (step S201).

Also inputted in the RAM 1102 through the interface 1107 are the "position and orientation of the magnetic receiver 105 in the sensor coordinate system" measured by the magnetic receiver 105 and the "position and orientation of the magnetic receiver 106 in the sensor coordinate system" measured by the magnetic receiver 106. These data are temporarily stored in the RAM 1102 (step S202).

Then, the marker 107 is identified through image recognition in the physical-space images acquired in the RAM 1102 at step S201, and the "position and orientation of the magnetic receiver 105" acquired at step S202 is corrected on the basis of the position of the marker 107 in the image (step S203).

The operation at step S203 is not necessary if sensors capable of accurately outputting all position and orientation information are used. Most magnetic sensors commonly used perform this operation in order to correct errors introduced by surroundings. If sensors can measure only their orientations, or if variation occurs in their orientations during a long measuring period, typically their positions are measured from images or variations in the orientations are corrected in images. The correction method is not limited to theses; various other correction methods have been proposed.

The physical-space images acquired into the RAM 1102 at step S201 are drawn in a predetermined area in the RAM 1102 (step S204). Then, the "data representing the position and orientation of the magnetic receiver 105 in the sensor coordinate system" acquired in the RAM 1102 at step S202 is converted by using data representing the "relation between the position and orientation of magnetic receiver 105 and those of the cameras 102R and 102L" (bias data) that is measured beforehand to obtain data representing the "positions and orientations of the cameras 102R and 102L in the sensor coordinate system". The data is used to draw virtual-space images viewed according to the positions and orientations of the cameras 102R and 102L. The images are drawn on the physical-space images drawn at step S204 (S205).

Thus, augmented-reality-space images viewed from the cameras 102R and 102L have been generated in the predetermined areas in the RAM 1102.

It should be noted that, in order to generate the virtual-space images, the virtual object 111 is place in a virtual space using the position and orientation measured by the magnetic receiver 106 attached to the physical object 110 and therefore the observer will see the virtual object 111 at that position when the observer looks at the position where the virtual object 111 is placed.

Then, the augmented-reality-space image (merged image) generated in the predetermined area in the RAM 1102 is provided to the display devices 101 of the HMD 100 and the display unit 1106 of the computer 103 through the interface 1107 (step S207).

The process descried above displays an augmented-reality-space image of one frame on the display devices 101 and the display unit 1106. The process can be repeated multiple times to display augmented-reality-space images of multiple frames on the display devices 101 and the display unit 1106.

When the CPU 1101 detects that an instruction to end the process is inputted through an operation of the user operation unit 1104, for example, the process will end.

While magnetic sensors are used in this embodiment, sensors of other types such as ultrasonic sensors may be used.

In the process described above, actually, the operation at step S201, that is, the acquisition of physical-space images, takes longer time than the operation at step S202 (acquisition of measurements with the sensors). Consequently, there is a difference (time lag) between the time of acquisition of physical-space images into the RAM 1102 at step S201 and the time of acquisition of the position and orientation of magnetic receivers 105 at step S202.

That is, even though the acquisition of the physical-space images is performed simultaneously with the measurement of the position and orientation, the physical-space images are acquired after a delay from the acquisition of the position and orientation. When the acquisition of the physical-space images is completed, the next (or the subsequent to the next) position and orientation have been acquired. Therefore, if the position and orientation are measured and concurrently physical-space images are taken while the observer is moving his/her head, the position and orientation of the viewpoint in the physical place represented in the image acquired at step 201 do not match the position and orientation of the viewpoint based on the position and orientation of the magnetic receiver 105 obtained at step S202. Accordingly, the virtual-space image generated based on the position and orientation acquired at step S202 differs from the physical-space image in viewpoint. Therefore, when the images are combined and rendered, the images of the physical object 110 and the virtual object 111 in the resulting image are misaligned with each other.

Figure 3:
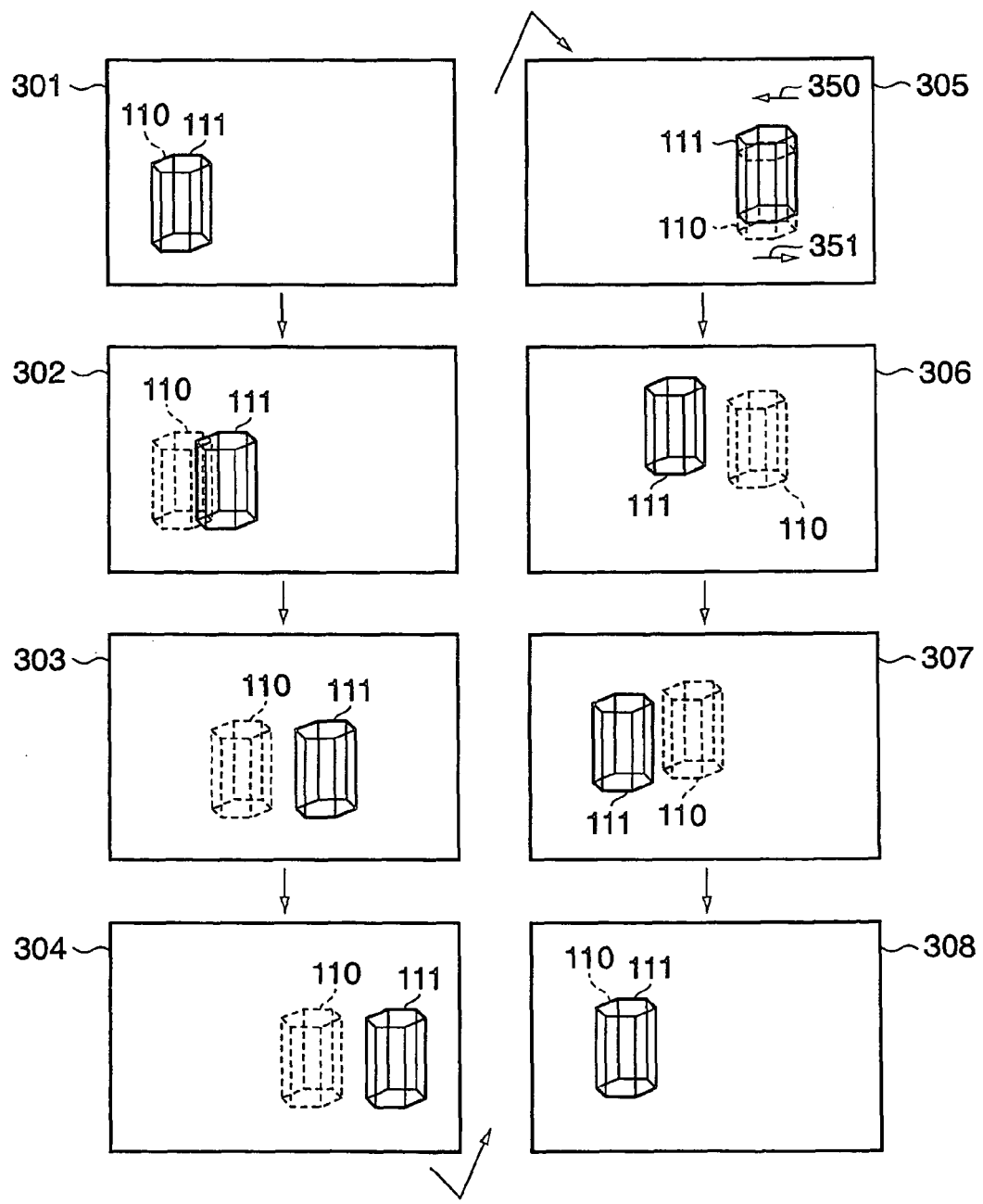
FIG. 3 is a diagram illustrating a misalignment between a physical object 110 and a virtual object 111 caused by a time lag.

FIG. 3 is a diagram illustrating misalignments between a physical object 110 and a virtual object 111 caused by a time lag. Images 301 to 308 are not displayed at a time but sequentially in this order. The images 301 to 308 are not displayed simultaneously but in this order. Each image is displayed on the display device 101 included in the HMD 100 or the display unit 1106 of the computer 103.

The virtual object 111 is placed in the same position and orientation where the physical object 110 is placed in order to superimpose the virtual image 111 on the physical object 110. Therefore, ideally the virtual object 111 is kept fixed on the physical object 110 on the display screen of the display device 101.

First, the physical object 110 and the virtual object 111 are displayed in approximately the same position and orientation in image 301 because the head of the observer is not moving. When the observer moves the head, the positions of the virtual object 111 and physical object 110 in the display screen of the display 101 of course change. As the observer turns the head to the left, the virtual object 111 and physical object 110 both move to the right in the display screen. Because a time lag is introduced as described above, the physical object 110 is an image viewed from the viewpoint at a position and orientation obtained earlier than the position and orientation of the viewpoint used for drawing the image of the virtual object 111. Consequently, the images displayed are misaligned with each other as shown in image 302. This arises from the fact that, although the virtual-space image has been generated in accordance with the movement of the head, the physical-space image to be obtained after the movement of the head has not yet been completely obtained (because there is a time lag as described above) and therefore the image of the physical image displayed is of the previous frame.

As the observer thereafter continues turning the head to the left, the display of the physical object 110 lags behind the movement of the virtual object 111, as shown in images 303 and 304.

Then, when the observer suddenly turns the head to the right while the head of the observer is turned the head to the left, the virtual object 111 moves in the direction indicated by arrow 350 in a display screen as shown in image 305, whereas the physical object 110 moves with a delay for the reason described above. Accordingly, the image of the physical object 110 moves in the direction indicated by arrow 351. Thus, this is why the images of the physical object 110 and virtual object 111 appear in different positions.

As the observer thereafter continues to turn the head to the right, the physical object 110 is displayed with a delay behind the motion of the virtual object 111 as shown in images 306 and 307.

When the observer stops turning the head, the virtual object 111 and the physical object 110 are aligned with each other as shown in image 308, as in image 301.

Therefore, according to the this embodiment, the time lag is obtained and a virtual-space image to be superimposed on a physical space is generated on the basis of the positions and orientations obtained earlier by the amount equal to the obtained time lag than the time of acquisition of the image of the physical-space image. As a result, the positions and orientations of the viewpoints of both images will be approximately identical to each other. Therefore, when the images of the physical object 110 and the virtual object 111 are combined with each other, the images are not misaligned with each other.

A process for calculating the time lag will be described below.

First, the observer wearing an HMD 100 on the head moves the head in any manner. For simplicity, it is assumed here that the observer turns the head from side to side. While the observer is doing this movement, the computer 103 performs the following process.

Figure 4:
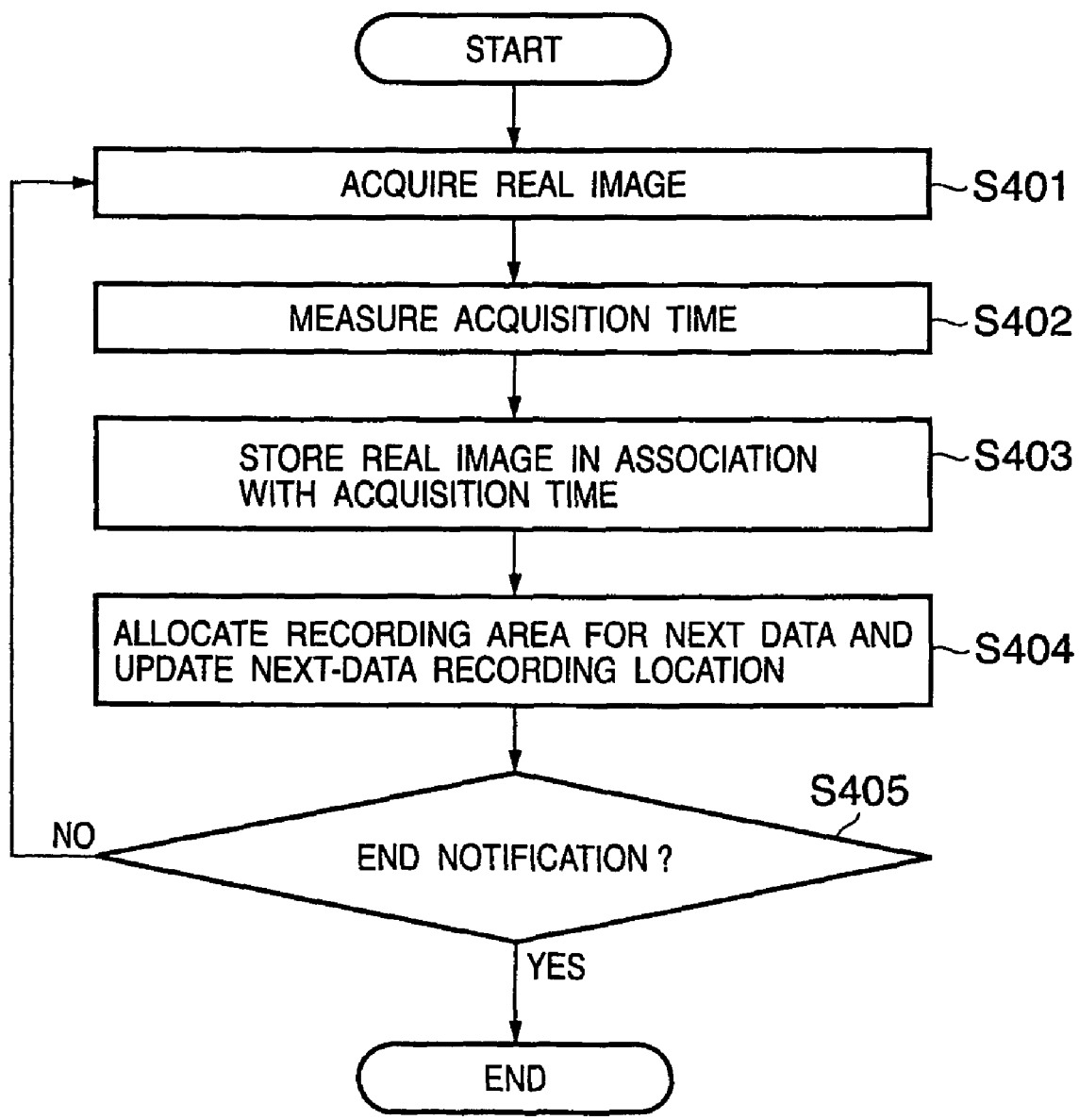
FIG. 4 is a flowchart of a process for acquiring physical-space images taken with a camera 102 built in the HMD 100 and storing the acquired images in an external storage device 1105 along with the acquisition time.

FIG. 4 shows a process performed by the computer 103 while the observer is moving the head as described above. In particular, FIG. 4 is a flowchart of a process in which a physical-space image taken with a camera 102 built in the HMD 100 is acquired and the acquired image is stored in an external storage device 1105 along with the acquisition time. It should be noted that a program and data for causing the CPU 1101 to perform the process according to the flowchart shown in FIG. 4 have been loaded from the external storage device 1105 into the RAM 1102, the CPU 1101 uses them to perform processing, and thereby the computer 103 performs the process described below.

Figure 5:
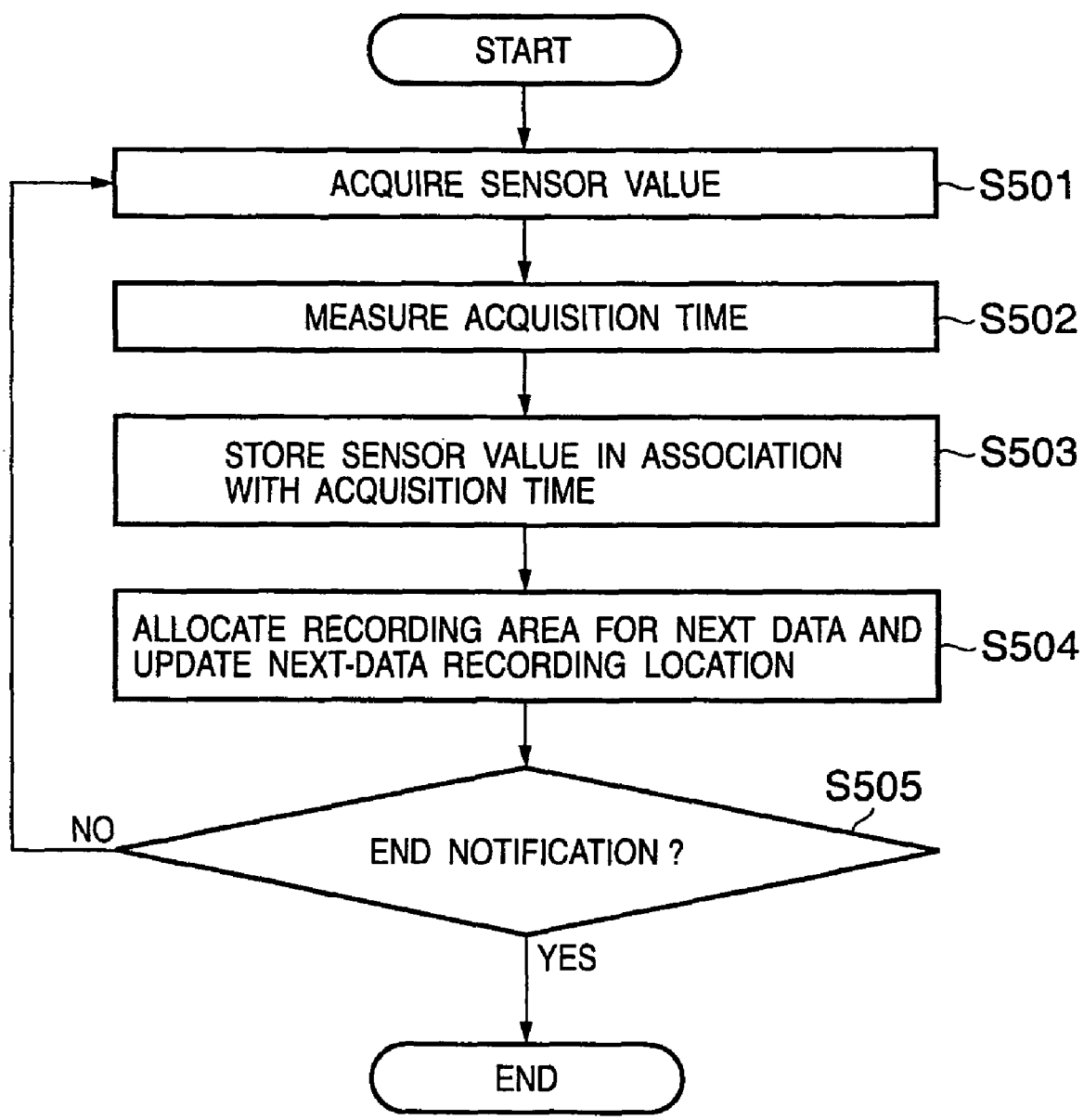
FIG. 5 is a flowchart of a process for acquiring the position and orientation of the HMD 100 measured using a magnetic receiver 105 built in the HMD 100 and the position and orientation of a physical object 110 measured using a magnetic receiver 106, and storing the acquired positions and orientations in the external storage device 1105 along with acquisition time.

FIG. 5 is a flowchart of a process performed by the computer 103 while the observer is moving the head. In particular, FIG. 5 is a flowchart of a process in which the position and orientation of the HMD 100 measured with the magnetic receiver 105 provided in the HMD 100 and the position and orientation of a physical object 110 measured with the magnetic receiver 106 are acquired and the acquired positions and orientations are stored in the external storage device 1105 along with the acquisition time. A program and data for causing the CPU 1101 to perform the process according to the flowchart shown in FIG. 5 have been loaded from the external storage device 1105 into the RAM 1102, the CPU 1101 uses them to perform processing, and thereby the computer 103 performs the processes described below.

It is desirable that the processes according to the flowcharts shown in FIGS. 4 and 5 be performed without delay. Therefore, it is desirable that the processes be performed as separate tasks on a real-time OS or as different threads on a multi-thread OS.

The process according to the flowchart shown in FIG. 4 will be described first.

Moving images in a physical space is taken with the camera 102 provided in the HMD 100 as stated above. The image of each frame taken is inputted into the computer 103 through the interface 1107 and the CPU 1101 acquires it into the RAM 1102 (step S401). Often, capture of high-frame-rate moving images are typically performed individually as a different thread or task. Therefore, the assumption in the this embodiment is that data primarily stored in a buffer is taken into the computer 103 in response to an end-of-capture call from an API of base software at step S401.

As stated above, the CPU 1101 is measuring the current time with an internal timer. The time at which the image has been captured at step S401 (the time at which image data inputted through the interface 1107 has been recorded in the RAM 1102) is measured (step S402) and data indicating the measured time is stored in the external storage device 1105 along with the image data acquired at step S401 (step S403).

It should be noted that, depending on the base software, it may be desirable that the time be measured at the time when the end of capture is detected in the base software before the acquisition of the image described with respect to step S401.

Then, a recording area in the external storage device 1105 is allocated for recording the physical-space image data to be inputted into the computer 103 and the image data acquisition time, and the recording location is updated so that the data is recorded in the recording area (step S404). If recording areas have been allocated all at once beforehand, a recording area does not need to be allocated each time data is to be recorded.

The process described above is repeated until an end-of-process instruction is inputted. The process according to the flowchart in FIG. 4 may be ended before starting a process for determining a delay time for the observer, which will be described later, thereby reducing the load on the PC. If the PC has sufficient throughput, the recording areas may be allocated in a ring so that data acquired over a certain past period of time can be always retained.

The process according to the flowchart shown in FIG. 5 will be described next.

As stated above, the magnetic receiver 105 outputs a signal in accordance with its position and orientation to the position and orientation measuring device 104, which in turn inputs data based on the signal to the computer 103. As stated above, the magnetic receiver 106 outputs a signal in accordance with its position and orientation to the position and orientation measuring device 104, which in turn inputs data based on the signal to the computer 103. Thus, the CPU 1101 acquires into the RAM 1102 the data indicating the position and orientation of the magnetic receiver 105 (sensor values) and data indicating the position and orientation of the magnetic receiver 106 (sensor values) (step S501).

In practice, the sensors are connected to the computer 103 through some type of communication means such as serial communication means. It is desirable that the communication channel be constantly monitored so that the moment at which an output is provided from the sensors can be detected, rather than actively obtaining the sensor values, because errors or extra delays are not introduced.

The CPU 1101 measure the time at which the position and orientation data has been acquired (step S502) and stores the measured time data in the external storage device 1105 along with the position and orientation data acquired at step S501 (step S503).

Then, a recording area in the external storage device 1105 is allocated for recording the position and orientation data to be inputted into the computer 103 and the data indicating the time of acquisition of the position and orientation data, and the recording location is updated so that the data is recorded in the recording area (step S504). If recording areas have been allocated all at once beforehand, the recording area does not need to be allocated each time data is to be recorded.

The process described above is repeated until an end-of-process instruction is inputted. The determination as to when the process in FIG. 5 is to be ended is made in a manner similar to that in the process in FIG. 4.

Figure 6:
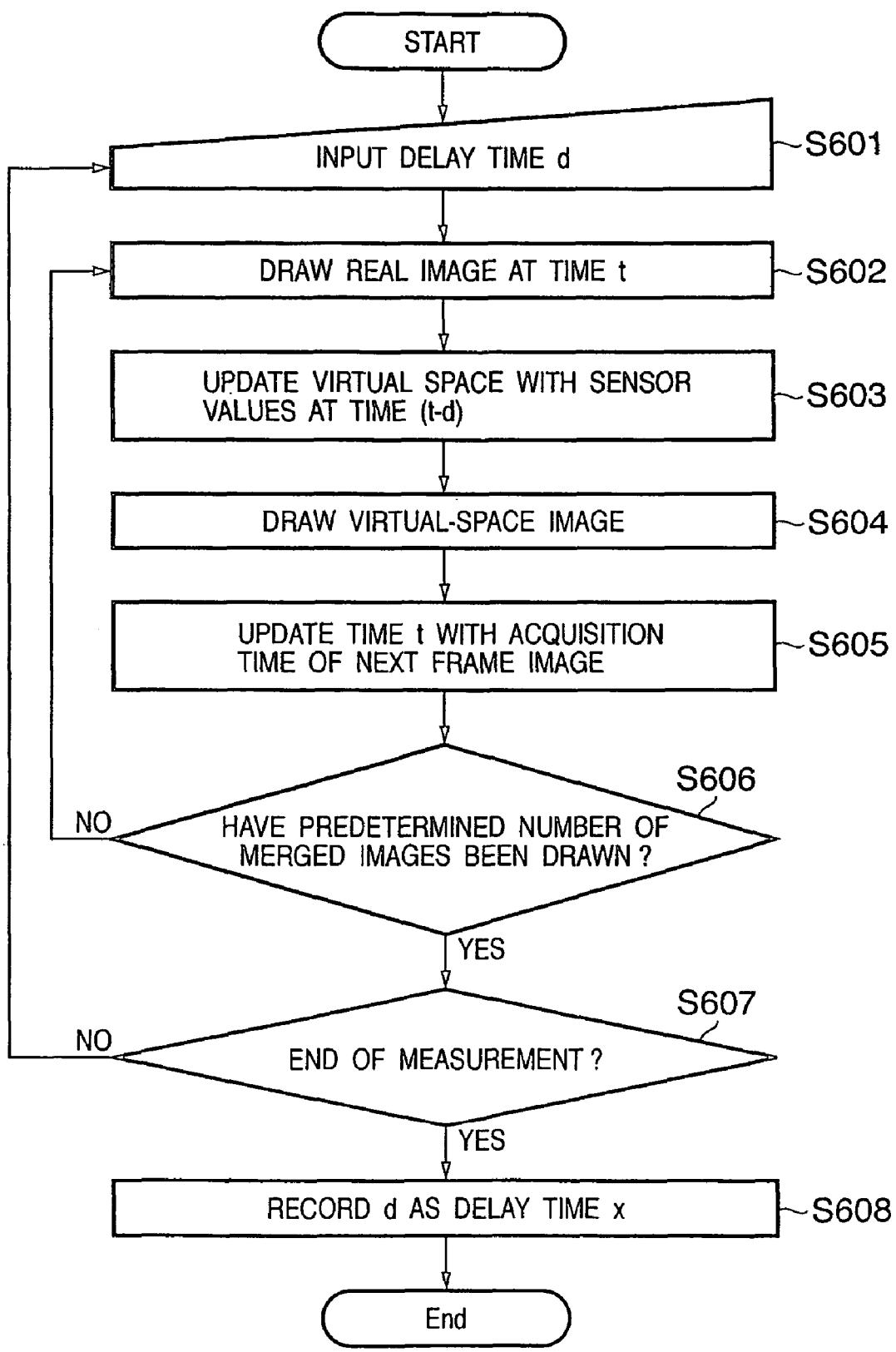
FIG. 6 is a flowchart of a process for obtaining a time lag.

The above-described process for obtaining a time lag will be described using FIG. 6 showing a flowchart of the process. It should be noted that a program and data for causing the CPU 1101 to perform the process according to the flowchart in FIG. 6 have been loaded from the external storage device 1105 into the RAM 1102. The CPU 1101 uses them to perform the process and thereby the computer 103 performs the process described below.

The process in the flowchart of FIG. 6 is performed after the completion of the processes according to the flowcharts shown in FIGS. 4 and 5. That is, the process according to the flowchart shown in FIG. 6 is performed by using "sets of physical-space images and the times at which the images have been acquired" stored in the external storage device 1105 as a result of the process according to the flowchart in FIG. 4 and "sets of positions and orientations and the times at which they have been acquired" stored in the external storage device 1105 as a result of the process according to the flowchart in FIG. 5.

First, the observer wearing the HMD 100 on the head moves the head in any manner. For simplicity, it is assumed here that the observer shakes the head from side to side. While the observer is doing so, the computer 103 performs the following process.

An operator of the computer 103 uses the user operation unit 1104 to input the value of "a variable 'd' indicating the amount of a lag" used in the subsequent processes, which is then temporarily stored in the RAM 1102 by the CPU 1100 (step S601).

Then, a physical-space image at time t is drawn on the RAM 1102 (step S602). It is assumed in this embodiment that the time "t" is set by the operator of the computer 103 by using the user operation unit 1104. It is assumed that the value of time t is in the range of values that the "acquisition time" stored in the external storage device 1105 as a result of the process of the flowchart in FIG. 4 (or FIG. 5) can take.

If the time t is equal to any of the values of "acquisition time" stored in the external storage device 1105 as a result of the process of the flowchart in FIG. 4 (or FIG. 5), the physical-space image stored in the external storage device 1105 in association with the acquisition time "t" is read into the RAM 1102 to accomplish the operation at step S602.

On the other hand if the value of time t is not equal to any of the values of "acquisition time" stored in the external storage device 1105 as a result of the process of the flowchart in FIG. 4 (or FIG. 5), but the value closest to the time t among the values of "acquisition time" stored in the external storage device 1105 is "ta", the physical-space image stored in the external storage device 1105 in association with the acquisition time "ta" is read into the RAM 1102 to accomplish the operation at step S602.

On the other hand, if the value of time t is not equal to any of the values of "acquisition time" stored in the external storage device 1105 as a result of the process of the flowchart in FIG. 4 (or FIG. 5) but times immediately preceding and following the time "t" are "ta1" and "tb" among the values of "acquisition time" (where ta<t<tb), the CPU 1101 uses the physical-space image stored in the external storage device 1105 along with the acquisition time "ta" and the physical-space image stored in the external storage device 1105 along with the acquisition time "tb" to interpolate a physical-space image at time "t" to accomplish the operation at step S602. The interpolation of the image is well-known and therefore the description of the process will be omitted.

In this way, the physical-space image at the specified time t is read into the RAM 1102.

Then, the position and orientation at the time (t−d) are used to generate a virtual-space image viewed from a viewpoint with the position and orientation (step S603). In particular, the virtual object 111 is placed in the position and orientation acquired from the magnetic receiver 106 at the time (t−d) and then a virtual-space image is generated that is viewed from a viewpoint in a position and orientation obtained by adding the bias data to the position and orientation acquired from the magnetic receiver 105 at the time (t−d). The process for generating the virtual-space image viewed from a given position and orientation is well-known and therefore the description of the process will be omitted.

If the time (t−d) is equal to any of the values of "acquisition time" stored in the external storage device 1105 as a result of the process of the flowchart in FIG. 4 (or FIG. 5), the virtual object 111 is placed in the position and orientation of the physical object 110 stored in the external storage device 1105 along with the acquisition time (t−d) and then a virtual-space image is generated that is viewed from a viewpoint in a position and orientation obtained by adding the bias data to the "position and orientation acquired form the magnetic receiver 105" stored in the external storage device 1105 along with the time (t−d), thereby accomplishing the operation at step S603.

On the other hand, if the time (t−d) is not equal to any of the values of "acquisition time" stored in the external storage device 1105 as a result of the process of the flowchart in FIG. 4 (or FIG. 5), but the time closed to the time (t−d) among the values of the "acquisition time" stored in the external storage device 1105 is "ta", the virtual object 111 is placed in the position and orientation of the physical object 110 stored in the external storage device 1105 along with the acquisition time "ta" and then a virtual-space image is generated that is viewed from the viewpoint in a position and orientation obtained by adding the bias data to the "position and orientation acquired from the magnetic receiver 105" stored in the external storage device 1105 along with the time "ta", thereby accomplishing the operation at step S603.

On the other hand, if the time (t−d) is not equal to any of the values of "acquisition time" stored in the external storage device 1105 as a result of the process of the flowchart in FIG. 4 (or FIG. 5) but the time immediately preceding and following the time (t−d) among the value of the "acquisition time" are "ta" and "tb" (where ta<t−d<tb), the CPU 1101 first uses the "position and orientation acquired from the magnetic receiver 105" stored in the external storage device 1105 along with the acquisition time "ta" and the "position and orientation acquired from the magnetic receiver 105" stored in the external storage device 1105 along with the acquisition time "tb" to interpolate the "position and orientation acquired from the magnetic receiver 105" at the time (t−d). The interpolation of the position and orientation will be described later.

Then, the virtual object 111 is placed in the position and orientation of the physical object 110 stored in the external storage device 1105 along with the acquisition time "ta" (or "tb") and then a virtual-space image is generated that is viewed from the viewpoint in a position and orientation obtained by adding the bias data to the interpolated position and orientation, thereby accomplishing the operation at step S603. The position and orientation of the physical object 110 in this case is constant independently of time and therefore interpolation of the position and orientation is not necessary. If the position and orientation are not constant, they must be interpolated in the same way as described above.

In this way, the virtual-space image viewed from the position and orientation at the time (t−d) is drawn on the RAM 1102.

To interpolate position information in the process described above, each of the coordinate values x, y, and z which are typically measured as position information is linearly interpolated by using measurement time as a parameter. For orientation information, Euler angles expression, which are represented by the azimuth, elevation, and roll, are commonly used. However, it is known generally that interpolation cannot be performed by using the Euler angle representation. In order to perform interpolation, orientation information is transformed into a quaternion. Interpolation of orientation can be accomplished by interpolating each element of the quaternion.

More precise interpolation can be performed by treating the quaternion as a four-dimensional vector and performing spherical linear interpolation of the vector on a four-dimensional hypersphere. Yet more precise interpolation can be accomplished by applying cubic interpolation or spline interpolation, instead of linear interpolation, to interpolate the position and orientation.

Then, the virtual-space image generated at step S603 is superimposed on the physical-space image drawn on the RAM 1102 beforehand at step S602 (step S604). As a result, one frame of augmented-reality-space image (an augmented-reality-space image viewed from the camera 102R or an augmented-reality-space image viewed from the camera 102L) is generated.

At step S604, the augmented-reality-space image generated is outputted to the display device 101 and the display unit 1106.

Then, time "t" is updated. For example, time "t" is updated to the next acquisition time (step S605). In that case, if the time interval for acquiring positions and orientations with the magnetic receivers 105 and 106 is denoted as "Δt", time "t" is updated to (t+Δt).

Then, determination is made as to whether a predetermined number of augmented-reality-space images have been generated (step S606). If not, the process returns to step S602, and step S602 and the subsequent steps are repeated.

If the predetermined number of augmented-reality-space images have been generated, the images, in each of which a virtual-space image viewed from the viewpoint based on the position and orientation at time (t−d) is superimposed on a physical-space image at time t (t=t1, t2, . . . , T), are displayed on the display device 101 and the display unit 1106.

FIG. 7 shows an exemplary display of a GUI including a user interface for inputting a lag and an area for displaying multiple (four in FIG. 7) generated augmented-reality spaces at a time.

Figure 7A:
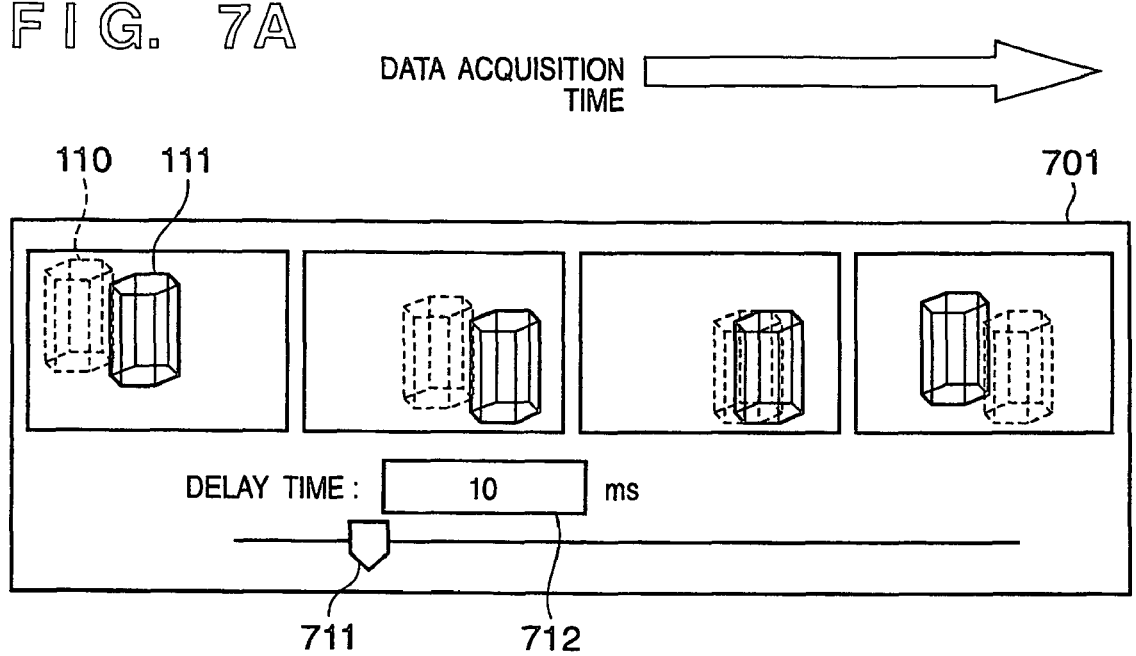
FIG. 7A shows an exemplary display of a graphical user interface having a user interface for entering an amount of lag and having a region for displaying a number of (four in this figure) generated augmented-reality spaces at a time.

FIG. 7A shows an exemplary display of the GUI, displaying augmented-reality-space images generated when a lag of d=10 ms is inputted using a user interface, which will be described below with respect to step S601. Reference numeral 701 denotes a window of the GUI, in which augmented-reality-space images are displayed in the order in which they were generated, from left to right. The augmented-reality-space images may be those viewed from the camera 102R or from the camera 102L.

Reference numeral 711 denotes a slider bar for inputting a lag. For example, moving the slider bar to the right increases the lag, to the left decreases.

Reference numeral 712 denotes a text box where a numeric value representing a lag to set can be entered.

At step S601, the value inputted by using a user interface, which is the slider bar 711 or the text box 712, is established as the lag. It should be noted that the user interface for an operator of the computer 103 to input a lag is not limited to these. Various other interfaces may be contemplated.

The physical object 110 and the virtual object 111 are not aligned with each other in FIG. 7A because a lag of d=10 ms is insufficient.

Figure 7B:
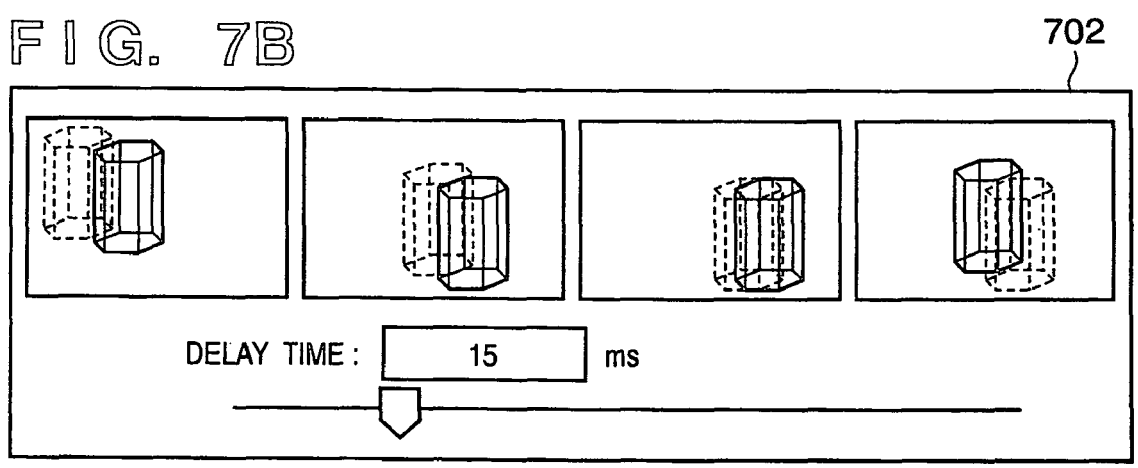
FIG. 7B shows an exemplary display of a graphical user interface having a user interface for entering an amount of lag and having a region for displaying a number of (four in this figure) generated augmented-reality spaces at a time.

FIG. 7B shows an exemplary display of the GUI, displaying augmented-reality-space images generated when a lag of d=15 ms is inputted by using the user interface at step S601.

As shown in FIG. 7B, the physical object 110 and the virtual object 111 are not aligned with each other because a lag of d=15 ms is still insufficient.

Figure 7C:
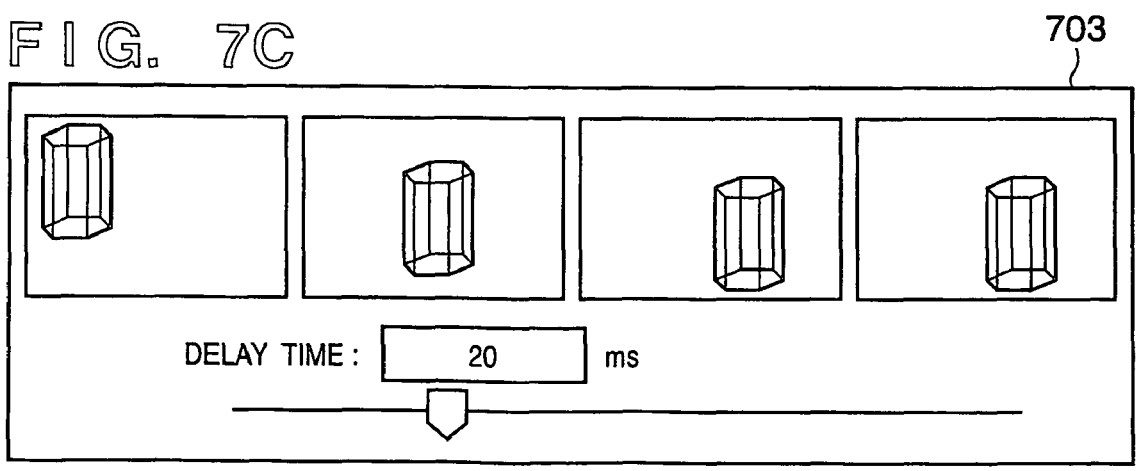
FIG. 7C shows an exemplary display of a graphical user interface having a user interface for entering an amount of lag and having a region for displaying a number of (four in this figure) generated augmented-reality spaces at a time.

FIG. 7C shows an exemplary display of the GUI, displaying augmented-reality-space images generated when a lag of d=20 ms is inputted by using the user interface at step S601. In this case, the physical object 110 and the virtual object 111 are substantially aligned with each other as shown in FIG. 7C. Therefore, a lag d of 20 ms is an appropriate value. This means that the time lag is 20 ms.

In this way, the operator of the computer 103 adjusts and inputs the lag while viewing augmented-reality-space images displayed on the GUI, so that the physical object 110 and the virtual object 111 are aligned with each other. Thus, the operator can visually determine, adjust, and input a lag such that the virtual object 111 and the physical object 110 align with each other.

Returning to FIG. 6, if the operator determines that the virtual object 111 and the physical object 110 are aligned with each other, the operator operates the user operation unit 1104 to input a command for recording the currently set lag on the external storage device 1105. Unless detecting such a command, the CPU 1100 returns to step S601 through step S607 and prompts the operator to input a new lag. On the other hand, if detecting such a command, the CPU 1100 proceeds to step S608 through step S607 and stores the currently set lag "d" in the external storage device 1105 as "delay time x" (step S608).

As a result of the process, the time lag can be obtained.

Figure 8:
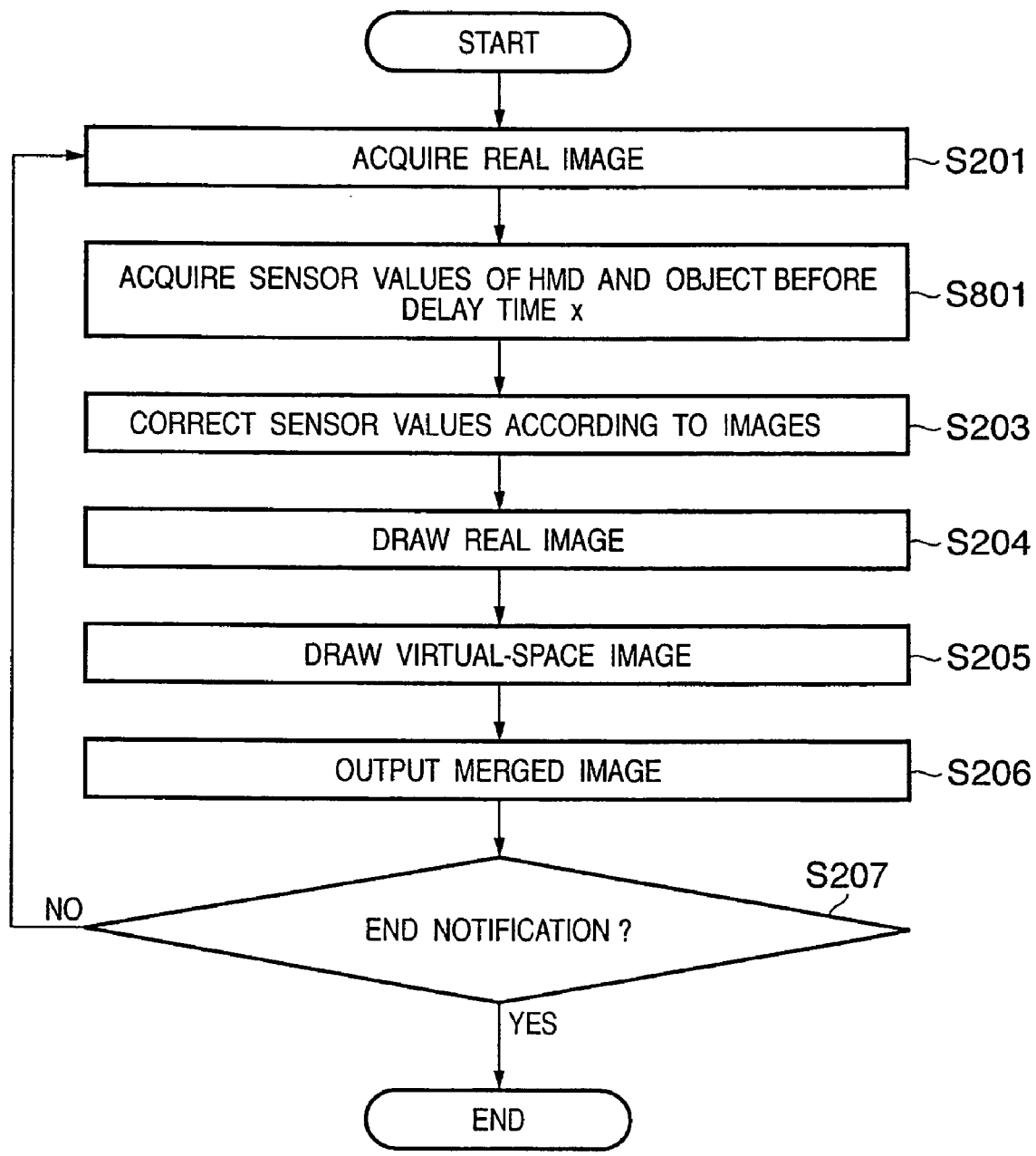
FIG. 8 is a flowchart of a process for using an obtained time lag to generate an augmented-reality-space image on which images of physical object 110 and virtual object 111 are aligned with each other even when the position and orientation of the HMD 100 change.

A process for using the obtained time lag to generate an augmented-reality-space image in which a physical object 110 and a virtual object 111 are aligned with each other in the augmented-reality-space image even when the position and orientation of the HMD 100 changes will be described using FIG. 8 showing a flowchart of the process. The same process steps in FIG. 8 as those in FIG. 2 are labeled with the same reference numerals and the description of which will be omitted.

It should be noted that a program and data for causing the CPU 1101 to perform the process according to the flowchart in FIG. 8 have been loaded from an external storage device 1105 to the RAM 1102, the CPU 1101 uses them to perform processing, and thereby the computer 103 performs the process described below.

At step S801, the "position and orientation of the magnetic receiver 105 in its sensor coordinate system" measured by the magnetic receiver 105 and the "position and orientation of the magnetic receiver 106 in its sensor coordinate system" measured by the magnetic receiver 106 are inputted into the RAM 1102 through the interface 1107. At least the positions and orientations measured during the time period previous to the current time that is equal to the time lag x obtained through the process described above are recorded on the RAM 1102. These positions and orientations measured during the time lag x earlier than the current time are obtained for use at step S205.

Therefore, the positions and orientations measured during the time period previous to the current time "t" that is equal to the time lag x can be used to generate a virtual-space image at step S205. Thus, misalignment between the physical object 110 and the virtual object 111 in the augmented-reality-space image caused by the time lag can be reduced.

While the set value of time t used in operation at step S602 is inputted by the operator of the computer 103 through the user operation unit 1104 in this embodiment, the present invention is not so limited. The value of time "t" may be set by the computer 103.

For example, a set of position and orientation data obtained through the process in the flowchart of FIG. 5 may be used to calculate the average position and orientation and the time at which an image appears in the calculated average position and orientation may be set as the "time t".

The magnetic receiver 106 is attached to a physical object 110 in this embodiment. However, if the position and orientation of a physical object 110 are fixed, the position and orientation of the physical object 110 in its sensor coordinate system may be measured beforehand without attaching a magnetic receiver 106 and data on the measured position and orientation are stored in the external storage device 1105 and used.

As has been described, according to the first embodiment, one or more augmented-reality-space images with the same time lag are presented to a user, and to input a new time lag, and allowing the user to check the augmented-reality-space image(s) with respect to the inputted time lag. Thus, the first embodiment has the advantageous effect that the time lag between an image and a sensor value can be readily measured.

Second Embodiment

In the first embodiment, multiple augmented-reality-space images generated are displayed at a time as shown in FIG. 7. In a second embodiment, augmented-reality-space images generated are displayed as moving images. In the GUI shown in FIG. 7, augmented-reality-space images of frames (at times t) are arranged and displayed at a time, whereas in the second embodiment images are displayed sequentially at the same position so that the augmented-reality-space images of frames are displayed as moving images.

To do so, the augmented-reality-space image currently generated is displayed at step S605 of the flowchart in FIG. 6 in a region where the previous augmented-reality-space image was displayed.

An operator can check a time lag in a comprehensive manner based on a larger number of augmented-reality-space images.

In some situations, it may be easier to evaluate a time lag using still images. Provision of the function of switching between still-image mode and moving-image mode may be effective.

As has been described, according to the second embodiment, multiple still or moving augmented-reality-space images are presented according to an inputted time lag, thereby enabling an operator to readily determine an appropriate time lag. Switching between still and moving augmented-reality-space images may also be used for the determination.

Third Embodiment

In a third embodiment, a computer 103 generates augmented-reality-space images and outputs them to a display device 101 and a display unit 1106. When an operator set a mode for performing a process for determining a lag (lag measurement mode), the computer 103 performs the processes shown in the flowcharts of FIGS. 4, 5, and 6 described with respect to the above embodiments.

Figure 9:
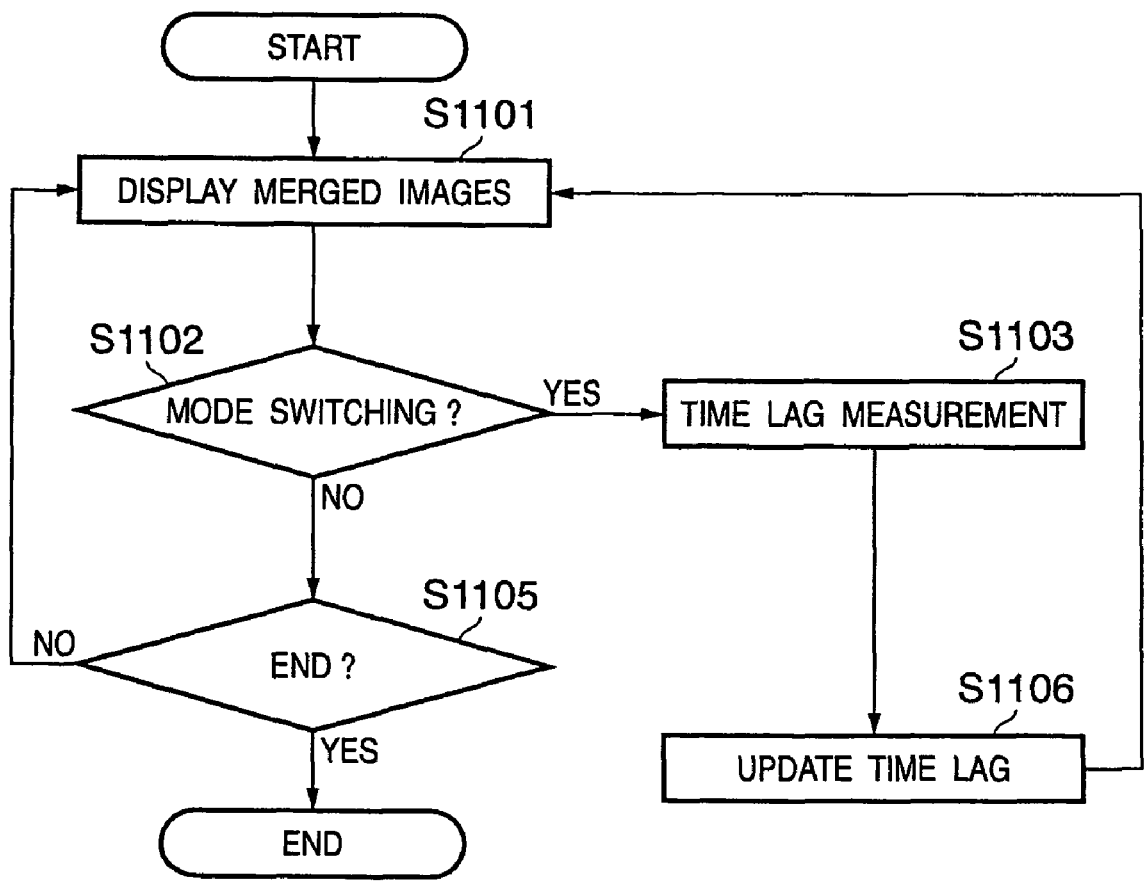
FIG. 9 is a flowchart of a process performed by a computer 103 according to a third embodiment of the present invention.

FIG. 9 is a flowchart of a process performed by a computer 103 according to the third embodiment. First, steps S201 to S206 of the flowchart in FIG. 2 are performed to generate augmented-reality-space images and output them to the display device 101 and the display unit 1106 (step S1101).

Then, determination is made as to whether the lag measurement mode is set by an operator of the computer 103 using a user operation unit 1104 (step S1102). As a result, if the lag measurement mode is not set, the process proceeds to step S1105, where determination is made as to whether the process should be ended (step S1105).

The process may be ended in response to a command inputted by the operator of the computer 103 using the user operation unit 1104, or may be ended by the control of the CPU 1100 when the CPU 1100 has detected that a predetermined condition is met.

In either case, if the process is not to be ended, the process returns to step S1101, and step S1101 and the subsequent steps are performed.

On the other hand, if it is determined at step S1102 that the lag measurement mode is set, the process proceeds to step S1103 and the processes according to flowcharts of FIGS. 4, 5, and 6 are performed (step S1103). Then, the lag recorded in the external storage device 1105 at step S1103 is set (step S1106) for use at step S1101 and then the process returns to step S1101.

According to the third embodiment described above, if the time lag has varied due to an external cause, the time lag can be readily and quickly modified.

Fourth Embodiment

A fourth embodiment will be described below with respect to differences from the first embodiment.

Figure 11:
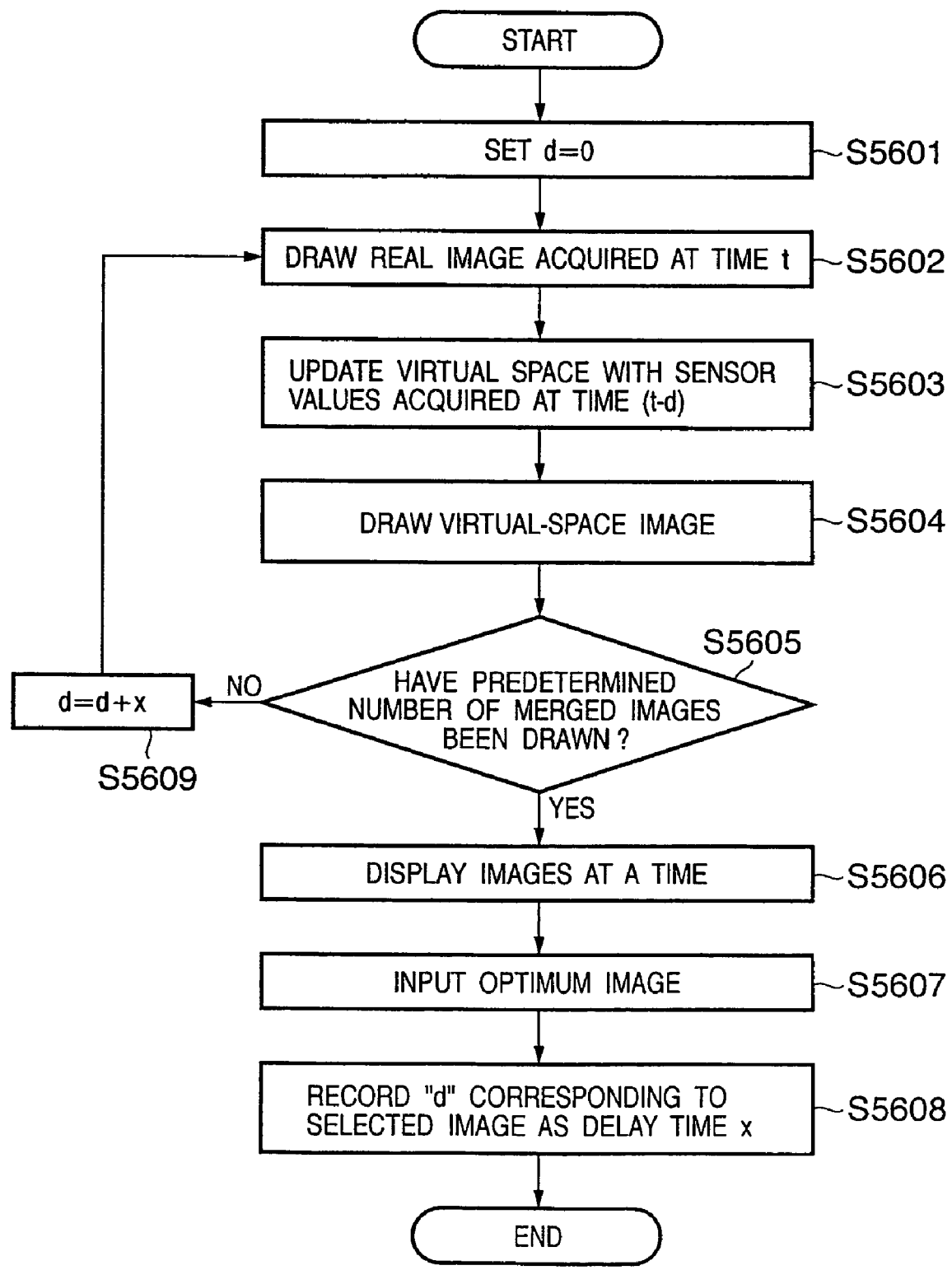
FIG. 11 is a flowchart of a process for obtaining a time lag.

Referring to FIG. 11, a process for determining a time lag will be described. A program and data for causing a CPU 1101 to perform the process of the flowchart in FIG. 11 have been loaded from an external storage device 205 to a RAM 1102, the CPU 1101 uses them to perform processing, and thereby the computer 103 performs the process described below.

It should be noted that the process of the flowchart in FIG. 11 is performed after the completion of the processes of the flowcharts shown in FIGS. 4 and 5. That is, the process of the flowchart shown in FIG. 11 is performed by using "sets of physical-space images and the times at which the images have been acquired" stored in the external storage device 1105 as a result of the process according to the flowchart in FIG. 4 and "sets of positions and orientations and the times at which they have been acquired" stored in the external storage device 1105 as a result of the process according to the flowchart in FIG. 5.

First, the value which a variable "d" used in the subsequent process has is initialized to 0 (step S5601). Then, a physical-space image at time t is drawn on the RAM 1102 (step S5602). The time "t" is specified by an operator by using a user operation unit 1104. The value of time t is in the range of values that the "acquisition time" stored in the external storage device 1105 as a result of the process of the flowchart in FIG. 4 (or FIG. 5) can take.

If the time t is equal to any of the values of "acquisition time" stored in the external storage device 1105 as a result of the process according to the flowchart of FIG. 4 (or FIG. 5), the physical-space image stored in the external storage device 1105 in association with that acquisition time "t" is read out.

If the value of time t is not equal to any of the values of "acquisition time" stored in the external storage device 1105 as a result of the process according to the flowchart of FIG. 4 (or FIG. 5), the physical-space image stored in the external storage device 1105 in association with the time "t1" that is the closest to the time "t" among the values of the "acquisition time" is read out.

To improve the precision of the process, the position and orientation data may be interpolated to obtain predicted data at the time t if the time t is not equal to any of the values of "acquisition time".

Linear interpolation of sensor values will be described in detail. To interpolate position information, each of the coordinate values x, y, and z, which are typically measured as position information is linearly interpolated by using measurement time as a parameter. For orientation information, Euler angles, which are expressed by the azimuth, elevation, and roll, are commonly used. However, it is known generally that interpolation cannot be performed by using the Euler angle representation.

In order to perform interpolation, orientation information is transformed into a quaternion. Interpolation of orientation can be accomplished by interpolating each element of the quaternion. More precise interpolation can be performed by treating the quaternion as a four-dimensional vector and performing spherical linear interpolation of the vector on a four-dimensional hypersphere. Yet more precise interpolation can be accomplished by applying cubic interpolation or spline interpolation, instead of linear interpolation, to interpolate the position and orientation.

As a result of the process described above, the physical-space image at the specified time "t" is read into the RAM 1102.

Then, the position and orientation at time (t−d) are used to generate a virtual-space image viewed from the viewpoint with the position and orientation.

Thus, the virtual-space image viewed from the position and orientation at time (t−d) is drawn on the RAM 1102.

While linear interpolation is good enough for interpolating images or position/orientation in the process described above, a smoother interpolation such as spline curve fitting may be required in some cases.

The virtual-space image generated at step S5603 is then superimposed on the physical-space image drawn on the RAM 1102 beforehand at step 5602 (step S5604). Thus, one augmented-reality-space image has been generated.

Then, determination is made as to whether a predetermined number of augmented-reality-space images have been generated (step S5605). If not, the process proceeds to step S5609, where the value x is added to the value which variable d has to update it (step S5609), then the process returns to step S5602, and the step S5602 and the subsequent steps are repeated.

If the predetermined number of augmented-reality-space images have been generated, the images, in each of which a virtual-space image viewed from the viewpoint based on the position and orientation at time (t−d) (where d=0, x, 2x, . . . , D) is superimposed on a physical-space image at time "t", are stored in the RAM 1102. If the value that the time t can take is such that T1≦t≦T2, then the value of "D" is set so that D≦t−T1 is satisfied. The value x is set to a value equal to time intervals at which the positions and orientations are obtained with magnetic receivers 105 and 106, for example.

If it is determined by a check process at step S5605 that the predetermined number of augmented-reality-space images have been generated, the process proceeds step 5606, where the multiple augmented-reality-space images generated as a result of the process are displayed on the display screen of the display unit 1106 at a time (step S5606).

Figure 12:
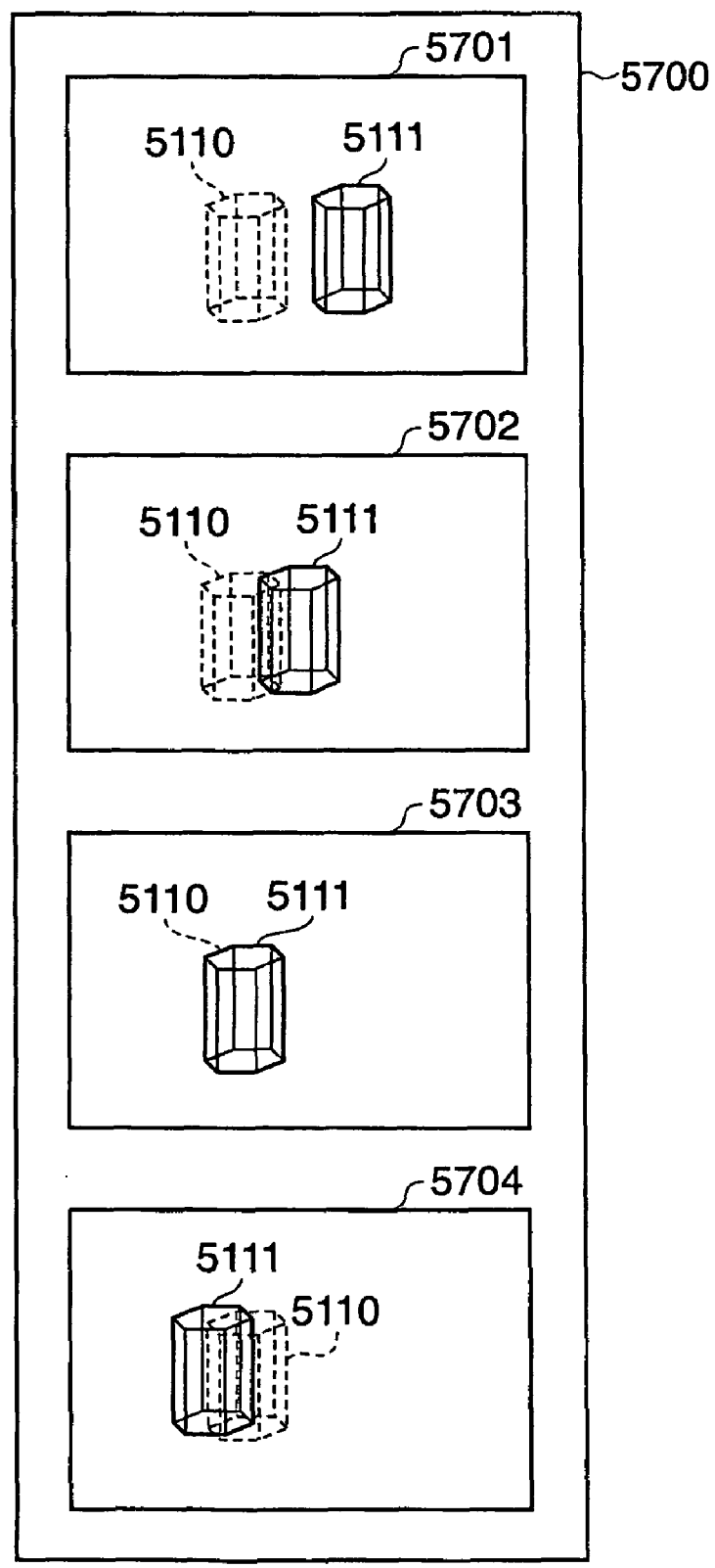
FIG. 12 shows an exemplary display in which multiple (four spaces in this figure) generated augmented-reality spaces are displayed at a time.

FIG. 12 shows an exemplary display in which multiple (four in FIG. 12) generated augmented-reality-space images are displayed at a time. Reference numeral 5700 denotes the display screen of the display unit 1106, in which four augmented-reality-space images 5701 to 5704 are displayed at a time. Image 5701 is the augmented-reality-space image generated when d=0, image 5702 is the augmented-reality-space image generated when d=x, image 5703 is the augmented-reality-space image generated when d=2x, and image 5704 is the augmented-reality-space image generated when d=3x.

Referring to images 5701 to 5704, the physical object 110 and the virtual object 111 are drawn in different positions and orientations in images 5701, 5702, and 5704, whereas the physical object 110 and the virtual object 111 are drawn in the same position and orientation in image 5703. This means that the time lag is 2x. Therefore, the observer looking at the images displayed on the display screen 5700 specifies the image in which the virtual object 111 and the physical object 110 are best aligned with each other, by using the user operation unit 1104. For an instruction method, for example, the observer moves a mouse cursor onto the image the observer wants to specify and clicks the mouse on it.

When detecting the specification of the image (step S5607), the CPU 1101 stores in an external storage device 1105 the value of "d" used when the specified image was generated as a time lag (step S5608).

As a result of the process described above, the time lag can be obtained. The process for using the obtained time lag to generate an augmented-reality-space image in which the physical object 110 and the virtual object 111 are kept aligned with each other in the augmented-reality-space image when the position and orientation of the HMD 100 changes is the same as that of the first embodiment, except that value α as given above is used as the time lag in the fourth embodiment instead of x used in the first embodiment.

As has been described above, according to the fourth embodiment, virtual images based on positions and orientations at different times are merged with the same physical-space image and the merged images are presented to the operator. Then, the image in which the physical-space image and a virtual image are best aligned with each other is visually obtained from the operator as information selected by the operator. According to the fourth embodiment, a time lag between a physical-space the image and a sensor value can be readily adjusted.

Fifth Embodiment

Images in virtual-apace images based on positions and orientations at different times are superimposed on a single physical-space image are displayed at a time in the fourth embodiment. In a fifth embodiment, the process of the flowchart in FIG. 11 is performed for each of physical-space images acquired at different times.

In particular, steps S5601 to S5606 and step S5609 of the flowchart in FIG. 11 are performed by using "time tα" instead of "time t", and then steps S5601 to S5605 and S5609 of the flowchart in FIG. 11 are performed by using "time tβ" instead of "time t".

Figure 13:
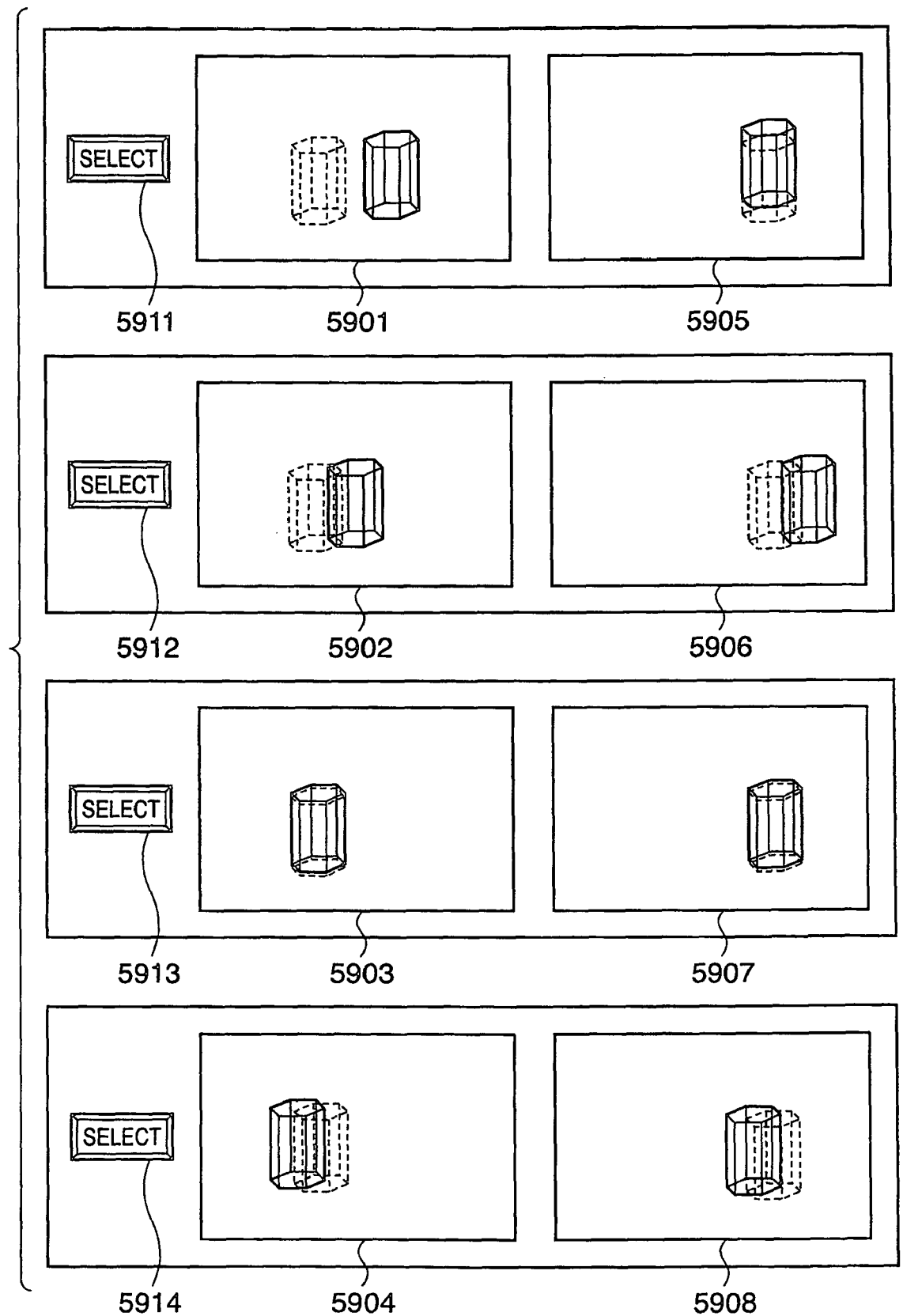
FIG. 13 shows an exemplary display in which multiple (eight spaces in this figure) generated augmented-reality spaces are displayed at a time.

If four augmented-reality-space images are generated at each of times tα and tβ, step S5606 of the process displays image 5901 in which a virtual-space image generated when d=0 is superimposed on a physical-space image acquired at time tα, image 5902 in which a virtual-space image generated when d=x is superimposed on a physical-space image acquired at time tα, image 5903 in which a virtual-space image generated when d=2x is superimposed on a physical-space image acquired at time tα, and image 5904 in which a virtual-space image generated when d=3x is superimposed on a physical-space image acquired at time tα, as shown in FIG. 13. Also displayed at step S5606 are image 5905 in which a virtual-space image generated when d=0 is superimposed on a physical-space image acquired at time tβ, image 5906 in which a virtual-space image generated when d=x is superimposed on a physical-space image acquired at time tβ, image 5907 in which a virtual-space image generated when d=2x is superimposed on a physical-space image acquired at time tβ, and image 5908 in which a virtual-space image generated when d=3x is superimposed on a physical-space image acquired at time tβ.

FIG. 13 shows an exemplary display in which the multiple (eight in FIG. 13) augmented-reality-space images thus generated are displayed at a time.

Displaying candidates with respect to more than one real image in this way allows the operator to readily recognize that the merge in image 5901 is inappropriate as compared with confusing merged images like image 5905, and to make a more accurate selection of a delay time of sensor values for images 5903 and 5907.

Augmented-reality-space images generated by using different values of "d" for the two different times tα and tβ are displayed as choices at a time in the foregoing description. However, it will be appreciated that different values of "d" may be used for two or more different times.

With this, multiple images can be checked with respect to each of the adjustment parameters, therefore more precise adjustment can be easily made.

Sixth Embodiment

In the fourth embodiment, when one of the augmented-reality-space images displayed at a time is specified, the value of the variable "d" used when the image was generated is determined as the time lag. In a sixth embodiment, after one of the images is specified, multiple times near the variable "d" used when that image was generated are set to obtain a time lag move accurately. For example, they may be set as "±0.1 seconds around "d". The setting may be made by the CPU 1101 or an operator of the computer 103 may input using the user operation unit 1104.

Figure 14:
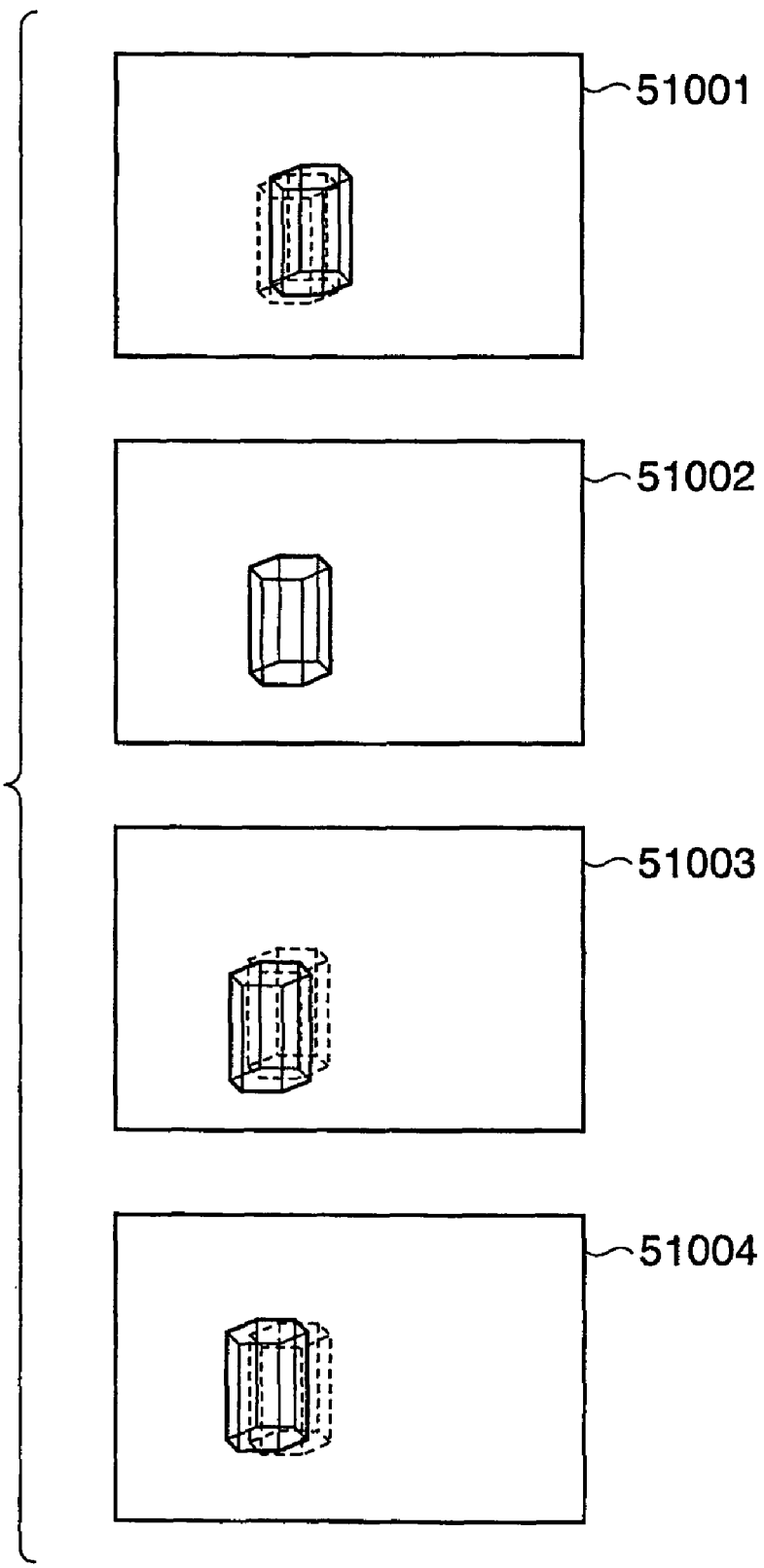
FIG. 14 shows an exemplary display in which augmented-reality-space images 51001, 51002, 51003, and 51004 generated when ds=ds1, ds2, ds3, and ds4, respectively, are displayed at a time.

If the set multiple times are ds=ds1, ds2, . . . , d, . . . , dsD, then the process of the flowchart in FIG. 11 is performed by using "ds" instead of "d", thereby displaying on the display screen of the display unit 1106 at a time an augmented-reality-space image in which a virtual-space image viewed from the viewpoint based on the position and orientation at time (t−ds1) is superimposed on a physical-space image acquired at time t, an augmented-reality-space image in which a virtual-space image viewed from the viewpoint based on the position and orientation at time (t−ds2) is superimposed on the physical-space image at time t, . . . , an augmented-reality-space image in which a virtual-space image viewed from the viewpoint based on the position and orientation at time (t−d) is superimposed on the physical-space image at time t, . . . , an augmented-reality-space image in which a virtual-space image viewed from the viewpoint based on the position and orientation at time (t−dsD) is superimposed on the physical-space image at time "t". FIG. 14 shows an exemplary list display of augmented-reality-space images 51001, 51002, 51003, and 51004 generated when ds=ds1, ds2, ds3, and ds4, respectively.

When one of these images is specified, the value of "ds" used when the specified image was generated is stored in an external storage device 1105 as a time lag.

In this way, after the value of "d" is determined, a lag between a physical object 110 and a virtual object 111 can be further checked for by using times around "d". Accordingly, a time lag can be obtained more precisely.

It should be noted that the sixth embodiment can be used in combination with the fifth embodiment as appropriate.

According to the sixth embodiment, finer adjustment can be made.

Seventh Embodiment

A seventh embodiment will be described below.

In the seventh embodiment, a measuring unit described in the fourth to sixth embodiments is added to an augmented-reality apparatus combining and displaying an image of a virtual object with a physical-space image.

Figure 15:
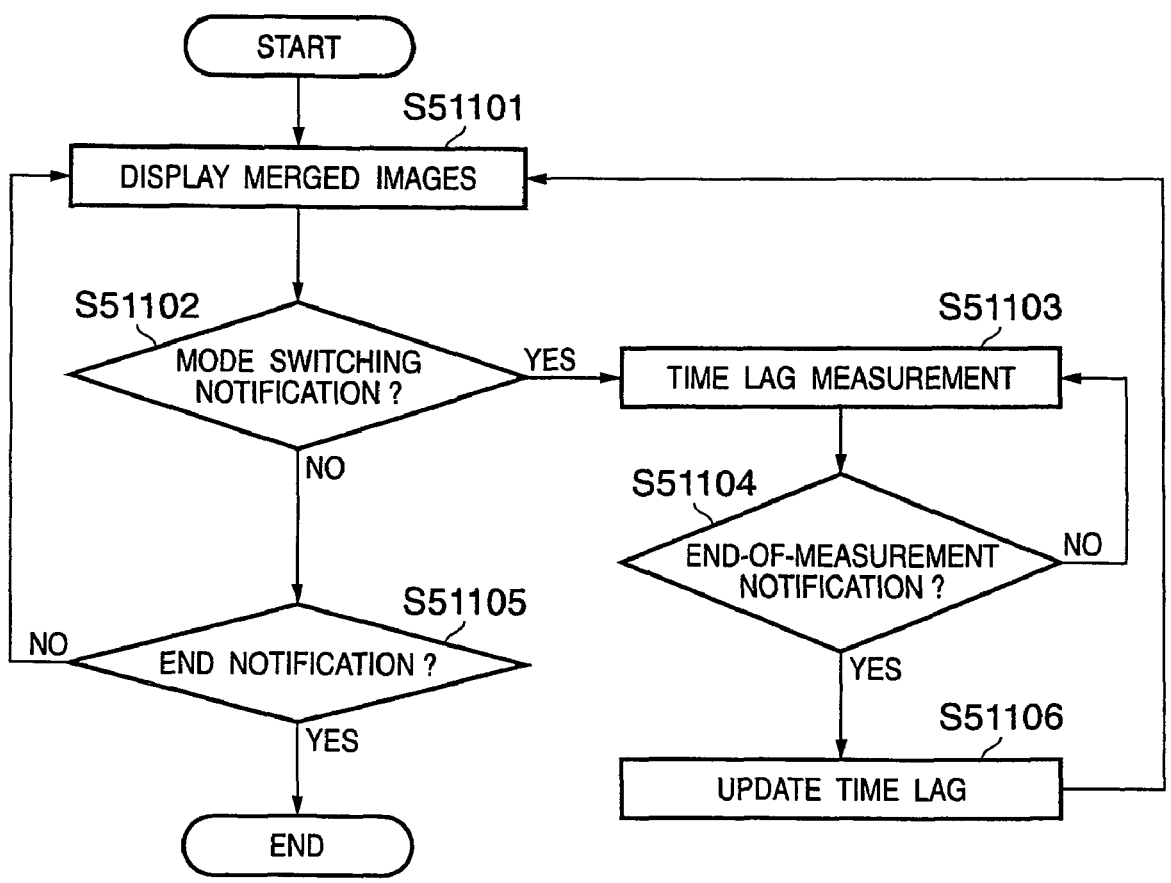
FIG. 15 is a flowchart illustrating a process according to a seventh embodiment of the present invention.

A process according to the seventh embodiment will be described with reference to FIG. 15. The basic configuration is the same as that of the fourth embodiment.

First, a merged image using augmented-reality technology is displayed at step S51101. Operation performed at step S51101 is the same as the operations performed at steps S201 to S206 in FIG. 2.

Then, determination is made at step S1102 as to whether notification that a command for mode switching has been entered through a keyboard or mouse operation is received.

If mode switching is not notified, determination is made at step S51105 as to whether a notification of the end of the overall augmented-reality processing is received. If not, operation for displaying merged images at step S51101 is repeated.

On the other hand, if a notification of mode switching is received at step S51102, the process proceeds to step S51103, where time lag measuring is performed.

In the time lag measuring at step S51103, processes similar to the processes shown in FIGS. 4, 5, and 11 are performed.

Then, if the end of measurement is not notified at step S51104, the process returns to step S51103 to continue measurement.

If the end of measurement is notified at step S51104, a time lag between images and sensor values that is to be used at step S51101 is updated in accordance with the measured values at step S51106 and a display of an augmented-reality combined image of step S51101 is performed.

According to the seventh embodiment, measurement of a time lag and a correction of a time lag changed due to an external cause can be performed readily and quickly in the augmented-reality apparatus.

Other Embodiment

It will be appreciated that the object of the present invention can also be accomplished by supplying a system or an apparatus with a recording medium (or a storage medium) on which a software program code that realizes the functions of any of the above-described embodiments is recorded, and causing a computer (or CPU or MPU) of the system or apparatus to read out and execute the program code stored on the recording medium. In this case, the program code itself read from the recording medium realizes the functions of any of the above described embodiments, and hence a recording medium on which the program code is recorded constitutes the present invention.

Furthermore, it is appreciated that the functions of any of the above-described embodiments can be accomplished not only by executing the program code read out by a computer, but also by causing an OS (operation system) or the like running on the computer to perform part or all of the actual operations based on instructions of the program code.

Moreover, it is appreciated that the functions of any of the above-described embodiments can be accomplished by loading the program code read out from the recording medium into a memory provided in an expansion board inserted into a computer or a memory provided in an expansion unit connected to the computer and causing a CPU or the like provided in the expansion board or the expansion unit to perform part or all of the actual operations based on instructions of the program code.

If the present invention is applied to the recording medium, a program code corresponding to any of the flowcharts described above will be stored in the recording medium.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-106784 filed on Apr. 1, 2005 and Japanese Patent Application No. 2005-106794 filed on Apr. 1, 2005, which are hereby incorporated by reference herein in its entirety.

What is claimed is:

1. An image processing method comprising:
    a first storage step of storing a captured image of each frame of moving images of a physical space acquired from an imaging device which captures the moving images, in association with the time at which the captured image has been captured;
    a second storage step of storing positions and/or orientations of the imaging device at respective times acquired from a sensor measuring the positions and/or orientations of the imaging device, in association with the time of acquisition of the positions and/or orientations;
    a lag setting step of setting data d representing a lag;
    a generation step of generating, for each time t, an image by superimposing a virtual-space image, based on the position and/or orientation whose acquisition time is based on time t and the lag d set in the lag setting step, on the captured image whose acquisition time corresponds to time t;
    a display step of displaying multiple of the respective images generated for the respective times t; and
    a determination step of determining a value for the lag d on the basis of a user instruction.

2. The image processing method according to claim 1, wherein the generation step generates, for each of times t=t1, t2, . . . , T, an image obtained by superimposing a virtual-space image viewed from a viewpoint having a position and/or orientation stored in association with time (t−d) on a captured image stored in association with the acquisition time t of the captured image.

3. The image processing method according to claim 1, wherein for the acquisition time to t of the captured image, if the relation of time (t−d) to the acquisition time ta and tb of the position and/or orientation stored at the second storage step is such that ta<(t−d)<tb,
    the generation step interpolates the position and/or orientation at the time (t−d) by using a position and/or orientation stored in associated with the time ta and the position and/or orientation stored in association with the time tb, and,
    for each of times t=t1, t2, . . . , T, generates an imaged obtained by superimposing a virtual-space image viewed from a viewpoint having the interpolated position and/or orientation on the captured image stored in association with the acquisition time t of the captured image.

4. The image processing method according to claim 1, wherein the generation step generates a plurality of images corresponding to times t=t1, t2, . . . , T respectively; and the display step displays the plurality of images generated at the generation step at a list.

5. The image processing method according to claim 1, wherein the generation step generates a plurality of images corresponding to times t=t1, t2, ..., T respectively; and
the display step displays the plurality of images generated at the generation step as moving images.

6. The image processing method according to claim 1, wherein the generation step generates a plurality of images in accordance with d=d0, d1, ..., D respectively.

7. The image processing method according to claim 6, further comprising a time setting step of setting time t1, wherein:
the first storage step stores captured images of a plurality of frames and the acquisition time of the captured images in association with each other;
if the set time t1 is equal to any of the acquisition time stored in association with captured images at the first storage step, the generation step generates, for each d=d0, d1, ..., D, an image by superimposing a virtual-space image viewed from a viewpoint having a position and/or orientation stored in association with time (t1−d) on a captured image stored in association with the time t1.

8. The image processing method according to claim 6, further comprising a time setting step of setting time t1, wherein:
the first storage step stores captured images of a plurality of frames and the acquisition time of the captured images in association with each other; and
if the set time t1 is not equal to any of the acquisition time stored at the first storage step but the acquisition time t2 is closest to the time t1 among the acquisition time stored, the generation step, for each d=d0, d1, ..., D, generates an image by superimposing a virtual-space image viewed from a viewpoint having a position and/or orientation stored in association with time (t2−d) on the captured image stored in association with the time t2.

9. The image processing method according to claim 6, further comprising a time setting step of setting time t1, wherein:
the first storage step stores captured images of a plurality of frames and the acquisition time of the captured image in association with each other;
if the relation of the set time t1 to the acquisition time t2 and t3 stored at the first storage step is such that t2<t1<t3,
the generation step generates a captured image at the time t1 with interpolation using the captured image stored in association with the time t2 and the captured image stored in association with the time t3,
generates a position and/or orientation at the time t1 with interpolation by using the position and/or orientation stored in association with the time t2 and the position and/or orientation stored in association with the time t3, and
generates, for each d=d0, d1, ..., D, an image by superimposing a virtual-space image viewed from a viewpoint having a position and/or orientation generated at the generation step on the captured image generated at the image generation step.

10. The image processing method according to claim 6, further comprising a time setting step of setting a plurality of times t1, wherein:
the first storage step stores captured images of a plurality of frames and the acquisition time of the captured images in association with each other; and
the generation step generates, for each d=d0, d1, ..., D, an image by superimposing a virtual-space image viewed from a viewpoint having a position and/or orientation corresponding to time (t1−d) on the captured image corresponding to time t1 for each of the set times t1.

11. The image processing method according to claim 1, further comprising a time setting step of setting time t1, wherein:
the generation step generates, for each d=d0, d1, ..., D, an image by superimposing a virtual-space image viewed from a viewpoint having a position and/or orientation corresponding to time (t1−d) on the captured image corresponding to the set time t1; and
the display step displays the images generated at the generation step;
the image processing method further comprising:
a second time setting step of setting, at the time (t1−d) corresponding to a position and/or orientation used when an image specified among images displayed at the display step has been generated at the generation step, time ds=ds1, ds2, ..., dsD that are close to the d;
a second generation step of generating, for each of ds=ds1, ds, ..., dsD, an image by superimposing a virtual-space image viewed from a viewpoint having a position and/or orientation corresponding to time (t1−ds) on the captured image corresponding to the set time t1; and
a second display step of displaying the images generated at the second generation step.

12. The image processing method according to claim 1, wherein the lag setting step acquires the lag based on an instruction from a user.

13. A non-transitory computer-readable storage medium storing a computer-executable program for making a computer execute the image processing method according to claim 1.

14. An image processing apparatus comprising:
first storage unit adapted to store a captured image of each frame of moving images of a physical space acquired from an imaging device which captures the moving image, in association with the time at which the captured image has been captured;
second storage unit adapted to store the positions and/or orientations of the imaging device at respective times acquired from a sensor measuring the positions and/or orientations of the imaging device, in association with the time of acquisition of the positions and/or orientations;
lag setting unit adapted to set data d representing a lag;
generation unit adapted to generate, for each time t, an image by superimposing a virtual-space image, based on the position and/or orientation whose acquisition time is based on time t and the lag d set in the lag setting unit, on the captured image whose acquisition time corresponds to time t;
display unit adapted to display multiple of the respective images generated, for the respective times t, by said generation unit; and
determination unit adapted to determine a value for the lag d on the basis of a user instruction.

15. The image processing apparatus according to claim 14, wherein said generation unit generates a plurality of images in accordance with each d=d0, d1, ..., D respectively.

16. The image processing apparatus according to claim 14, further comprising a time setting unit for setting time t1, wherein:
said generation unit generates, for each d=d0, d1, ... D, an image by superimposing a virtual-space image viewed from a viewpoint having a position and/or orientation corresponding to time (t1−d) on the captured image corresponding to the set time t1; and said display unit displays the images generated by said generation unit;

said image processing apparatus further comprising:

second time setting unit adapted to set, at the time (t1−d) corresponding to a position and/or orientation used when an image specified among images displayed by said display unit has been generated by said generation unit, time ds=ds1, ds2, . . . dsD that are close to the d;

second generation unit adapted to generate, for each ds=ds1, ds2, . . . dsD, an image by superimposing a virtual-space image viewed from the viewpoint having a position and/or orientation corresponding to time (t1−ds) on a captured image corresponding to the set time t1; and second display unit adapted to display the image generated by said second generation unit.

17. The image processing apparatus according to claim 14, wherein said lag setting unit acquires the lag based on an instruction from a user.

\* \* \* \* \*